US008214254B1

(12) United States Patent
Mowry

(10) Patent No.: US 8,214,254 B1
(45) Date of Patent: Jul. 3, 2012

(54) METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS (II)

(75) Inventor: Craig P. Mowry, Southampton, NY (US)

(73) Assignee: Home Producers Network, LLC, Scottsdale, AZ (US)

( * ) Notice: Subject to any disclaimer, the term of this patent is extended or adjusted under 35 U.S.C. 154(b) by 427 days.

(21) Appl. No.: 12/475,443

(22) Filed: May 29, 2009

Related U.S. Application Data

(63) Continuation-in-part of application No. 09/808,538, filed on Mar. 14, 2001, now Pat. No. 7,720,707, which is a continuation-in-part of application No. 09/756,581, filed on Jan. 8, 2001, now abandoned.

(60) Provisional application No. 60/175,093, filed on Jan. 7, 2000, provisional application No. 60/176,440, filed on Jan. 14, 2000, provisional application No. 60/189,060, filed on Mar. 14, 2000, provisional application No. 60/212,663, filed on Jun. 20, 2000, provisional application No. 60/226,672, filed on Aug. 22, 2000, provisional application No. 61/130,044, filed on May 29, 2008.

(51) Int. Cl.
*G06Q 30/00* (2006.01)
*G07G 1/14* (2006.01)
(52) U.S. Cl. .................................. 705/14.1; 705/14.4
(58) Field of Classification Search .................. 705/14.1, 705/14.4
See application file for complete search history.

(56) References Cited

U.S. PATENT DOCUMENTS

| 5,041,972 A | 8/1991 | Frost |
| 5,609,160 A | 3/1997 | Bahl et al. |

(Continued)

FOREIGN PATENT DOCUMENTS

| AU | 2002357397 | 7/2003 |

(Continued)

OTHER PUBLICATIONS

Cirit, et al., "Consumer Profiling Using Fuzzy Query and Social Network Techniques," 6 pages, 2005.

(Continued)

*Primary Examiner* — Arthur Duran
(74) *Attorney, Agent, or Firm* — Ostrolenk Faber LLP

(57) ABSTRACT

A system and method is provided for interactive exchange of information. A processor is in operable connection with processor readable media, a database provided on the processor readable media stores preference information related to a plurality of individuals. The processor is operable to retrieve and provide search results from the database in response to prompted requests for information. A module is provided on the media, and is operatively coupled to the processor to receive requests for information from a user and the database provider in tandem. A search results module is operable to provide a first search result in response to a search by the user, and is further operable to provide a second search result that relates to the first search results. The first search result relates to a first group of the plurality of users and the second search result relates to a second group of a plurality of the users of the database that is distinct from the first group, and the first search result includes first preference information and the second search result includes second preference information, wherein the first preference information is at least partially different from the second preference information.

17 Claims, 10 Drawing Sheets

U.S. PATENT DOCUMENTS

| | | |
|---|---|---|
| 5,661,516 A | 8/1997 | Carles |
| 5,717,923 A | 2/1998 | Dedrick |
| 5,724,424 A | 3/1998 | Gifford |
| 5,754,939 A | 5/1998 | Herz et al. |
| 5,784,095 A | 7/1998 | Robbins et al. |
| 5,794,210 A | 8/1998 | Goldhaber et al. |
| 5,848,397 A | 12/1998 | Marsh et al. |
| 5,852,775 A | 12/1998 | Hidary |
| 5,855,515 A | 1/1999 | Pease et al. |
| 5,856,102 A | 1/1999 | Bierke-Nelson et al. |
| 5,956,691 A | 9/1999 | Powers |
| 5,974,398 A | 10/1999 | Hanson et al. |
| 6,020,884 A | 2/2000 | MacNaughton et al. |
| 6,052,122 A | 4/2000 | Sutcliffe et al. |
| 6,105,001 A | 8/2000 | Masi et al. |
| 6,112,186 A | 8/2000 | Bergh et al. |
| 6,175,831 B1 | 1/2001 | Weinreich et al. |
| 6,193,610 B1 | 2/2001 | Junkin |
| 6,216,133 B1 | 4/2001 | Masthoff |
| 6,236,975 B1 * | 5/2001 | Boe et al. ............... 705/7.32 |
| 6,236,978 B1 | 5/2001 | Tuzhilin |
| 6,269,361 B1 | 7/2001 | Davis et al. |
| 6,288,717 B1 | 9/2001 | Dunkle |
| 6,291,171 B1 | 9/2001 | Ricciardi et al. |
| 6,321,221 B1 * | 11/2001 | Bieganski ............... 705/26.7 |
| 6,324,566 B1 | 11/2001 | Himmel et al. |
| 6,338,094 B1 | 1/2002 | Scott et al. |
| 6,351,736 B1 | 2/2002 | Weisberg et al. |
| 6,411,949 B1 | 6/2002 | Schaffer |
| 6,466,918 B1 | 10/2002 | Spiegel et al. |
| 6,480,785 B1 | 11/2002 | Joerg et al. |
| 6,487,539 B1 | 11/2002 | Aggarwal et al. |
| 6,519,629 B2 | 2/2003 | Harvey et al. |
| 6,527,557 B2 | 3/2003 | Lemay et al. |
| 6,546,545 B1 | 4/2003 | Honarvar et al. |
| 6,601,037 B1 | 7/2003 | Kolls |
| 6,604,086 B1 | 8/2003 | Kolls |
| 6,606,605 B1 | 8/2003 | Kolls |
| 6,609,103 B1 | 8/2003 | Kolls |
| 6,609,120 B1 | 8/2003 | Honarvar et al. |
| 6,615,183 B1 | 9/2003 | Kolls |
| 6,625,581 B1 | 9/2003 | Perkowski |
| 6,629,080 B1 | 9/2003 | Kolls |
| 6,681,369 B2 | 1/2004 | Meunier et al. |
| 6,684,197 B1 | 1/2004 | Kolls |
| 6,757,661 B1 | 6/2004 | Blaser et al. |
| 6,792,411 B1 | 9/2004 | Massey, Jr. |
| 6,807,532 B1 | 10/2004 | Kolls |
| 6,871,186 B1 | 3/2005 | Tuzhilin et al. |
| 6,873,965 B2 | 3/2005 | Feldman et al. |
| 6,886,000 B1 | 4/2005 | Aggarwal et al. |
| 6,901,406 B2 | 5/2005 | Nabe et al. |
| 6,925,468 B1 | 8/2005 | Bobbitt et al. |
| 6,930,676 B2 | 8/2005 | De Haan et al. |
| 6,947,976 B1 | 9/2005 | Devitt et al. |
| 6,952,741 B1 | 10/2005 | Bartlett et al. |
| 6,968,315 B1 | 11/2005 | Nakisa |
| 6,970,844 B1 | 11/2005 | Bierenbaum |
| 6,973,439 B1 | 12/2005 | Wilk |
| 6,976,439 B2 | 12/2005 | Uchida |
| 6,999,987 B1 | 2/2006 | Billingsley et al. |
| 7,003,546 B1 | 2/2006 | Cheah |
| 7,006,979 B1 | 2/2006 | Samra et al. |
| 7,014,469 B1 | 3/2006 | Nocera et al. |
| 7,031,651 B2 | 4/2006 | McCormick et al. |
| 7,043,531 B1 | 5/2006 | Seibel et al. |
| 7,054,831 B2 | 5/2006 | Koenig |
| 7,054,900 B1 | 5/2006 | Goldston |
| 7,082,427 B1 | 7/2006 | Seibel et al. |
| 7,085,820 B1 | 8/2006 | Nickerson et al. |
| 7,095,426 B1 | 8/2006 | Childress |
| 7,120,629 B1 | 10/2006 | Seibel et al. |
| 7,158,986 B1 | 1/2007 | Oliver et al. |
| 7,231,608 B1 | 6/2007 | Fano et al. |
| 7,236,969 B1 | 6/2007 | Skillen et al. |
| 7,318,224 B2 | 1/2008 | Honarvar et al. |
| 7,321,233 B2 | 1/2008 | Strid et al. |
| 7,330,850 B1 | 2/2008 | Seibel et al. |
| 7,337,127 B1 | 2/2008 | Smith et al. |
| 7,356,541 B1 | 4/2008 | Doughty |
| 7,398,219 B1 | 7/2008 | Wolfe |
| 7,430,514 B1 | 9/2008 | Childress et al. |
| 7,451,094 B2 | 11/2008 | Royall, Jr. et al. |
| 7,475,032 B1 | 1/2009 | Patnode et al. |
| 7,599,802 B2 | 10/2009 | Harwood et al. |
| 7,603,331 B2 | 10/2009 | Tuzhilin et al. |
| 7,752,326 B2 | 7/2010 | Smit |
| 8,005,896 B2 | 8/2011 | Cheah |
| 8,103,611 B2 | 1/2012 | Tuzhilin et al. |
| 8,150,913 B2 | 4/2012 | Cheah |
| 2001/0013009 A1 | 8/2001 | Greening et al. |
| 2001/0032115 A1 | 10/2001 | Goldstein |
| 2001/0042002 A1 | 11/2001 | Koopersmith |
| 2001/0056374 A1 * | 12/2001 | Joao ............... 705/14 |
| 2002/0052761 A1 | 5/2002 | Fey et al. |
| 2002/0059379 A1 | 5/2002 | Harvey et al. |
| 2002/0065894 A1 | 5/2002 | Dalal et al. |
| 2003/0023489 A1 | 1/2003 | McGuire et al. |
| 2003/0061215 A1 | 3/2003 | Messina |
| 2003/0142664 A1 | 7/2003 | Gerszberg et al. |
| 2004/0128624 A1 * | 7/2004 | Arellano et al. ............... 715/530 |
| 2004/0133471 A1 | 7/2004 | Pisaris-Henderson et al. |
| 2004/0204661 A1 | 10/2004 | Epler |
| 2004/0215514 A1 | 10/2004 | Quinlan et al. |
| 2004/0261127 A1 | 12/2004 | Freeman et al. |
| 2005/0075543 A1 | 4/2005 | Calabrese |
| 2005/0125354 A1 | 6/2005 | Pisaris-Henderson et al. |
| 2006/0026067 A1 | 2/2006 | Nicholas et al. |
| 2007/0073581 A1 | 3/2007 | Kempe et al. |
| 2007/0093258 A1 | 4/2007 | Steenstra et al. |
| 2007/0118420 A1 | 5/2007 | Jung et al. |
| 2007/0122824 A1 | 5/2007 | Tucker et al. |
| 2007/0130002 A1 | 6/2007 | Moran et al. |
| 2007/0208610 A1 | 9/2007 | Pisaris-Henderson et al. |
| 2007/0239537 A1 | 10/2007 | Protheroe et al. |
| 2008/0033815 A1 | 2/2008 | Choi |
| 2008/0033826 A1 | 2/2008 | Maislos et al. |
| 2008/0050735 A1 | 2/2008 | Pushnova |
| 2008/0189047 A1 * | 8/2008 | Wong et al. ............... 702/20 |
| 2008/0227063 A1 * | 9/2008 | Kenedy et al. ............... 434/219 |
| 2008/0228531 A1 * | 9/2008 | Kenedy et al. ............... 705/4 |
| 2008/0228708 A1 * | 9/2008 | Kenedy et al. ............... 707/2 |
| 2008/0228735 A1 * | 9/2008 | Kenedy et al. ............... 707/3 |
| 2008/0228768 A1 * | 9/2008 | Kenedy et al. ............... 707/6 |
| 2009/0012841 A1 | 1/2009 | Saft et al. |
| 2009/0018918 A1 | 1/2009 | Moneypenny et al. |
| 2009/0030774 A1 | 1/2009 | Rothschild et al. |
| 2009/0030775 A1 | 1/2009 | Vieri |
| 2009/0030972 A1 | 1/2009 | Rogers |
| 2009/0043648 A1 | 2/2009 | Mahdian et al. |
| 2009/0055249 A1 | 2/2009 | Lieberman |
| 2009/0063283 A1 | 3/2009 | Kusumoto et al. |
| 2009/0063284 A1 | 3/2009 | Turpin et al. |
| 2009/0067599 A1 | 3/2009 | Agarwal et al. |
| 2009/0076899 A1 | 3/2009 | Gbodimowo |
| 2009/0076902 A1 | 3/2009 | Grinsted et al. |
| 2011/0087693 A1 * | 4/2011 | Boyce ............... 707/769 |

FOREIGN PATENT DOCUMENTS

| | | |
|---|---|---|
| AU | 2003293160 | 11/2003 |
| JP | 2004533020 | 10/2004 |
| WO | WO 02/104005 | 12/2002 |
| WO | WO 03/058531 | 7/2003 |
| WO | WO 2004/021152 | 3/2004 |
| WO | WO 2004/051418 | 6/2004 |
| WO | WO 2005/043341 | 5/2005 |

OTHER PUBLICATIONS

Klaas Kox, HAIT Master Thesis series nr. 08-005, "Mobile Contextual Advertising," Tilburg University, Tilburg, The Netherlands, Dec. 2008, 28 pages.

http://www.google.com/press/pressrel/pressrelease39.html, Google Launches Self-Service Advertising Program, Oct. 23, 2000.

Upendra Shardanand and Pattie Maes, MIT Media-Lab, "Social Information Filtering: Algorithms for Automating 'Word of Mouth,'" May 7-11, 1995, CHI '95 Mosaic of Creativity, pp. 210-217.

http://m.wired.com/magazine/2010/07/ff_caterina_fake/ Devin Leonard, What You Want: Flickr Creator Spins Addictive New Web Service, Jul. 28, 2010, pp. 1-5.
http://web.archive.org/web/19981212013921/http://facebook.com/.
http://web.archive.org/web/19990125085655/http://facebook.com/.
http://web.archive.org/web/19990208013055/http://www.facebook.com/.
http://web.archive.org/web/19990825020910/http://facebook.com/index.html.
http://web.archive.org/web/20000414064120/http://facebook.com/index.html.
Encyclopedia of Library and Science, vol. 71, Allen Kent, p. 156 (2002).
http://en.wikipedia.org/wiki/Keyword_advertising.
http://news.cnet.com/Pay-for-replacement-gets-another-shot/2100-1023_3-208309.html.
http://sigchi.org/chi95/proceedings/papers/us_bdy.htm.

* cited by examiner

Fig. 7

METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS (II)

CROSS-REFERENCE TO RELATED APPLICATIONS

This application is a continuation-in-part of U.S. patent application Ser. No. 09/808,538, now U.S. Pat. No. 7,720,707, filed on Mar. 14, 2001, issued on May 18, 2010, in the name of Craig P. Mowry and entitled A METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS, which is a continuation-in part of U.S. patent application Ser. No. 09/756,581, filed on Jan. 8, 2001 in the name of Craig P. Mowry and entitled A METHOD AND SYSTEM FOR ELICITING CONSUMER DATA BY PROGRAMMING CONTENT WITHIN VARIOUS MEDIA VENUES TO FUNCTION COOPERATIVELY, now abandoned, which is based on and claims priority to U.S. Provisional Patent Application Ser. Nos. 60/175,093, filed on Jan. 7, 2000, 60/176,440, filed on Jan. 14, 2000, 60/189,060, filed on Mar. 14, 2000, 60/212,663, filed on Jun. 20, 2000, 60/226,672, filed on Aug. 22, 2000, and further, this application is based on and claims priority to U.S. Provisional Patent Application Ser. No. 61/130,044, filed on May 29, 2008 in the name of Craig Mowry and entitled SYSTEM AND METHOD FOR TRAIT BASED PEOPLE SEARCH BASED ON GENETIC INFORMATION, the contents of all of which are incorporated in their entirety by reference as if set forth herein.

BACKGROUND

1. Field of the Invention

The present invention relates, generally, to communication and, more particularly, to enabling people to exchange information in order to discern and communicate with each other.

2. Description of the Related Art

Electronic communication networks, such as provided via the Internet, cellular technology and other forms of electronic interactive communication have provided avenues for exchanging many kinds of information, criteria and/or data.

Current "match-making" and trait/preference search options, such as those provided by Internet sites, often require extensive profile information and trait/preference data submissions from users, including by keying information into data entry forms, making selections using a mouse or other pointing device, or by verbally providing information, such as during an interview process. Such profile building by users takes time, effort and leaves open a potential for inaccurate reporting of trait(s) and or preference(s) aspects. This is, for example, due to intentional or unintentional errors, including resulting from a distorted self-awareness.

SUMMARY

In one embodiment, a system and method is provided for interactive exchange of information. A processor is in operable connection with processor readable media, a database provided on the processor readable media stores preference information related to a plurality of individuals. The processor is operable to retrieve and provide search results from the database in response to prompted requests for information. A module is provided on the media, and is operatively coupled to the processor to receive requests for information from a user and the database provider in tandem. A search results module is operable to provide a first search result in response to a search by the user, and is further operable to provide a second search result that relates to the first search results. The first search result relates to a first group of the plurality of users and the second search result relates to a second group of a plurality of the users of the database that is distinct from the first group, and the first search result includes first preference information and the second search result includes second preference information, wherein the first preference information is at least partially different from the second preference information.

In another embodiment, a system and method is provided for an interactive exchange of information. A processor is provided in operable connection with processor readable media, and a database is provided on the processor readable media. The database stores trait information and preference information related to a plurality of individuals. A first request for information is received in response to a first prompt, and a first electronic search result from the database is provided in response to the first prompted request. Further, a second electronic search result that relates at least in part to the first electronic search result is provided. The first search result relates to a first group of the plurality of users and the second search result relates to a second group of a plurality of the users of the database that is distinct from the first group. The first search result includes first preference information and the second search result includes second preference information, wherein the first preference information is at least partially different from the second preference information.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIGS. 7-10 illustrate example display screens in accordance with one or more embodiments.

DESCRIPTION OF EMBODIMENTS

Figure 1:
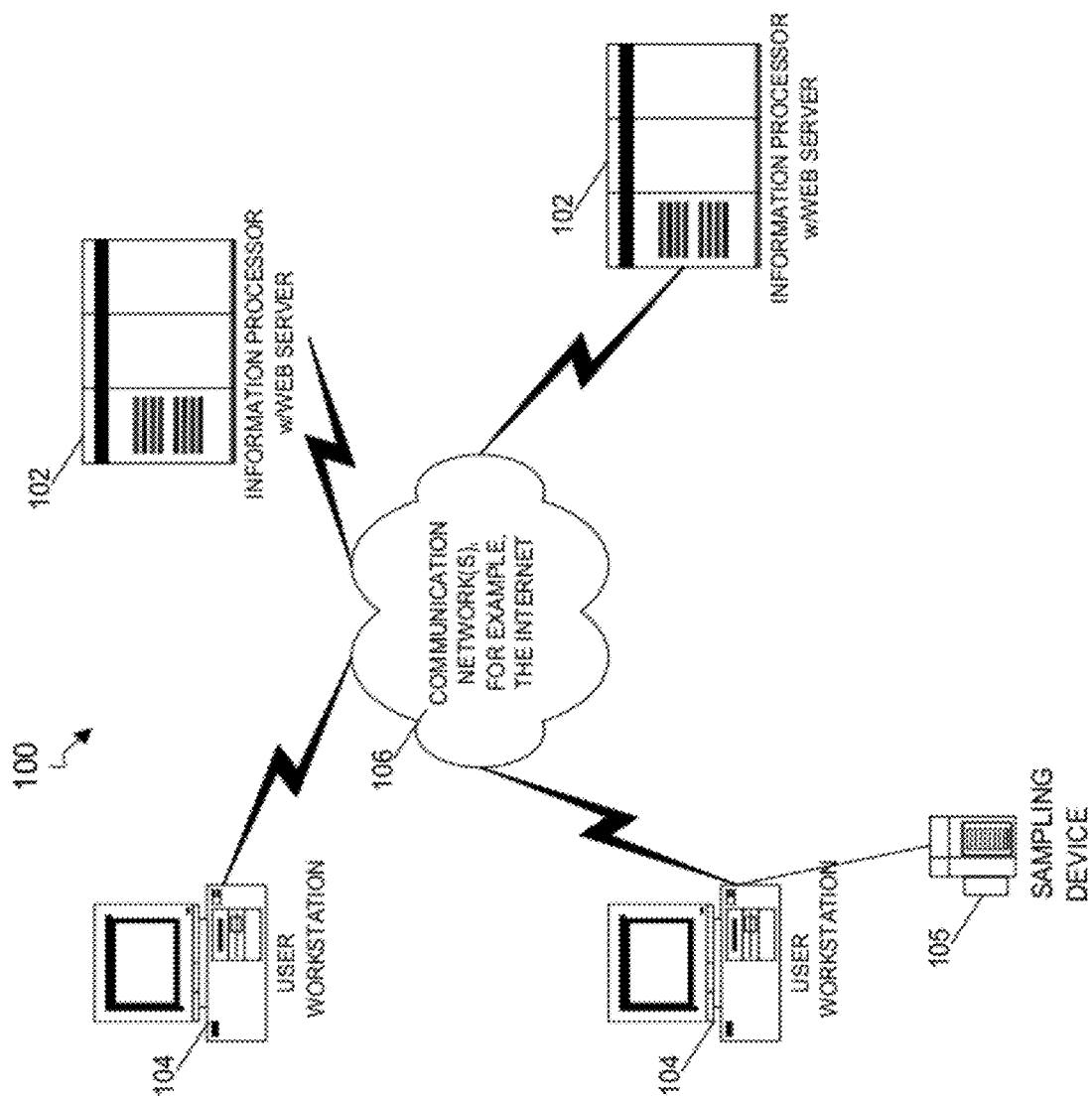
FIG. 1 shows an example hardware arrangement in an embodiment.

In one embodiment, electronic, interactive (for example Internet) connectivity is provided to allow people to search and locate each other, as well as to exchange trait and/or preference related information. The connectivity also enables introductions between individuals who would otherwise be unlikely to discover each other, and enjoy a respective synergy.

As known in the art, the HUMAN GENOME PROJECT includes the studying and categorizing of human traits and other biological conditions, including diseases, for a better understanding of genetic sequences and defects relative to human traits, conditions and other biological manifestations related to the human condition.

In one embodiment, a comparative system is provided for virtually any living thing that embodies genetic material. For example, a researcher is interested in locating animals that share similar genetic aspects. Using the systems and methods disclosed herein, including by searching one or more databases, the researcher locates the animals.

In one embodiment, an individual's genetic sequence data are used for profile information in connection with social web sites and people matching sites, such as E-HARMONY.COM and MATCH.COM. At least some user "profile" information, such as input via keyboard, verbal commands and other suitable mode of data entry, are replaced or supplemented with data that are at least partially derived from biological, genetic, viral or other information related to an biological sample from the individual. As used herein, "genetic profiling" refers to creating data from an individual's biological and/or genetic information. In this embodiment, the genetic data are stored in a database and indexed for other users to discern (e.g., learn about) each other, as well as to provide and enable communication between users. Users may also contribute to indexing data by submitting additional information in the database, such as ratings or classifications, that help others determine the nature and/or reliability of data related to individuals who are represented within the database.

In one embodiment, genetic sequence evaluation of an individual is provided in one or more of a series of stages. In one stage, genetic information related to a user may be provided by one or more hardware devices operated by a home user. One non-limiting example is described in U.S. Patent Application Publication No. 2004/0204661, entitled "Genomics Home Test Kit." Other known systems exist as well. In one embodiment, an individual user's genetic information is extrapolated by a home device, which is coupled to computer hardware and/or software, thereby providing private, convenient and efficient personal genetic data collection and profiling. Users obtain one or more genetic samples using known, so called "stay-at-home," devices that enable users to obtain and use their own genetic information privately. In this way, anonymous genetic profiling is provided quickly and conveniently for a user. Profiling information may be provided without requiring a user to leave a home or office environment, and without a need to travel to clinical or medical facilities.

Once genetic and/or biological data are extrapolated from an individual, an interactive Internet web site is provided to receive the data. In an alternative embodiment, an Internet web site includes a service to interface with a device designed specifically for extracting genetic material or for obtaining a biological sample from a user and, thereafter, to obtain selected genetic and/or biological data related thereto. The user uploads the selected genetic data to the site for further processing or, alternatively, the data are uploaded substantially automatically. Eventually, at least some selected genetic data that are uploaded are stored and indexed to be available for other users of the systems and methods provided herein. Accordingly, genetic data are available for other users to discern (e.g., learn about, question, compare, etc.) each other, as well as to provide and enable communication among users.

In preferred embodiments, users upload genetic and/or biological information and/or data related to genetic and/or biological information to an information processor. Users conduct searches for other individuals based on trait and/or preference information that is related to the individual's genetic and/or biological information. In order to protect privacy concerns, users are restricted to reviewing only information featured within a database that relates to individuals who previously provided genetic information to the database, and who have granted authorization for other users to access information stored in the database that relates thereto. In scenarios where only part of such information is deemed relevant by a searcher/user, only that trait and/or preference information relative to individual's interest is provided.

In one embodiment, searching options enable a user to locate one or more individuals' information in a database by matching biological and/or genetic information that is provided by a searching user. Thus, a substantially automatic searching capability is provided for searching by matching genetic and/or biological information provided by a searcher to genetic and/or biological information relating to others that is stored in the database. Alternatively, manual searching options are provided that include choices for searchers to select specific traits/aspects that are matched with genetic information and/or trait and preference information from other individuals. For example, information may be matched in the database that relates at least in part to genetic information determined to represent relevant information pursuant to selections made by a user, relative to individuals' data stored in the database.

Moreover, data matching processes are provided that are based not only on similarity, but also on selected differences between biologically based data (e.g., genetic profile information), as well. For example, a male looking for a female mate indicates that dissimilar gender information should be identified. In a more complex example, an aggressive person seeking a passive person may depend upon specific aspects of the HUMAN GENOME PROJECT that may be determined to reveal characteristics that at least affect and/or relate to the search.

Accordingly and in connection with at least one embodiment, the teachings herein relate to discerning and/or enabling communication between people, one person to another, although one person to a group and/or group to group communications are similarly supported. Use of electronic communications, such as via the Internet, cellular telephone technology and other electronic interactive communication technologies provides a way for people to exchange relevant information, criteria and/or data. The connectivity provided in accordance with the teachings herein enable introductions between individuals and/or groups who would be otherwise unable or unlikely to discover each other, and to develop respective synergy there-between.

The teachings herein include computing aspects that are available to at least two individuals. A database is maintained for categorized data related to at least one individual. Moreover, biological data encoding and/or referencing is provided to provide at least one of the individuals' biological trait and/or preference pertinent information in search technology. Other aspects/components may be provided that include a wide range of comparative search options for a user. The ease and speed of providing such comparative search options, as well as the accuracy and discreetness of comparing and reporting relevant database search results based on biological information are among the benefits provided in accordance with the teachings herein.

In one example, an individual seeks a mate who is of the same sex and searches by matching biological information of the searching individual. In such a scenario, that searcher provides biological material, such as skin, urine, blood, saliva and/or other biological material to a hardware device included in a "home" sampling version. Therein, the "home" system analyzes and provides an acceptable threshold of data for accuracy and usability. The data are transmitted to a database that stores information from others who, likewise, are represented by an acceptable threshold. The searcher's data are selectively compared and contrasted with other data stored in the database and a determination of relative degrees of similarity of those who meet a minimum threshold of similarity is made, pursuant to the searcher's request, instruction and/or criteria.

In one embodiment, the database of information related to individuals is provided based on a similarity ranking. For example, information for one thousand individuals is represented as genetic profile data within the database. A similarity request made by a searcher orders all 1,000 people in relation to their respective similarities to that searcher. Further, one or more secondary searches allow for refining and/or revising comparison searches, with the initially provided similarity results and/or the revised or different group (and/or ranking) of individuals represented within the database. For example, a search for men who meet a threshold of aggressiveness results in unanticipated search results directed to women who have a minimum degree of aggressiveness or, alternatively, passiveness.

Further, security and authentication features are provided, such as to authenticate users submitting genetic-based or biological-based information to a database. Data parameters may be applied and/or referenced for data that are generated from biological samples, potentially under the control and supervision of a database provider. At least minimal known authentication processes are optionally employed.

In addition to enabling users to locate and communicate with each other, a social network is provided in one or more embodiments to enable users to search for other users, at least in part by identifying traits and/or preferences of people of interest. Moreover, a revenue-generating platform is provided in an embodiment, including to support advertisers' priorities that steer the user toward particular demographics and/or areas of preference that may have not been searched for or otherwise indicated as an area of interest by a searcher or other user, initially.

Moreover, user data that are stored in the database are weighed and classified to determine respective relevance to a searching user. By weighing and classifying data, selected information can be provided to a searching user in subsequent searches, such as sampled from the database, and provided in response to new search criteria that are either entered by the user, or automatically entered without user input. In this way, the interest and illusion of relevance and control to the user is provided and/or maintained, even though unsolicited factual information is provided that related to other individuals and that may be at least partially selected by the relevance of the data to the user's initial search inquiry, as well as to at least one advertiser or other authorized individual.

Thus, and in accordance with an embodiment, a plurality of different interests are served, even if such interests may be initially competing or incongruous. Searchers may be steered to a new demographic, and/or an entirely distinct group of individuals as a function of subsequent, potentially advertiser driven influence. Accordingly, users may be redirected to other individual(s), who may be of interest, an actual individual or, alternatively, an entirely new "type" or person of interest, which may be related to the original search of a group by an association or "link." For example, a user, JOE, is searching for information about someone unlike himself, such as a female of interest, and the sort of gifts such women find most romantic and/or exciting. In response, information is provided to JOE relating to a woman, Sue, at least in part directly addressing his search for what to buy her. Thereafter, information is provided as a factoid or other informational prompt that regards men whom women like Sue find most attractive. Accordingly, a determination is made, based on information gleaned about JOE, including related to JOE's initial search parameters, to alter the scope of JOE's initial search. Advertisers' interests in targeting a particular user are determined, and factual information related to the advertisers is provided to JOE. JOE perceives the factual information to be relevant to his initial search related to Sue.

Continuing with the present example, information related to automobile preferences is provided, with paying client MERCEDES listed as the second most popular brand among men whom women like Sue find most attractive. In this example, the issue of men whom women like Sue find attractive, as opposed to interesting, is a variable determined to be significant, and to provide automobile information in a way that is psychologically acceptable and believable to the user. This is accomplished by presenting MERCEDES and additional information and/or special opportunities regarding MERCEDES in ways that are receptive to users. In this example, MERCEDES appeared second in the search results, and related, at least by association, to Sue. If MERCEDES had been listed first, the search results would have represented men in the database who are preferred by women like Sue based on how interesting the women find them, rather than how attractive they find them. The result would have been that JOE would likely feel manipulatively solicited and would lose interest in further interaction with the site. Displaying MERCEDES at the second position, lower on the list of results, however, makes JOE feel more in control and less manipulated. Thus, and as demonstrated in the above example, a target user is more likely to use and/or purchase goods and services from a particular advertiser based on such advertiser data being accepted by the user as factual and even solicited by the user, even though the user did not directly search for such data.

In another embodiment, a social networking site or venue is provided that converges a media product, such as a television program and an on-line product, such as an Internet website providing interactivity among a plurality of users. In one embodiment, the venue includes users who have a collective effect on the "program," as well as an individual effect, with at least one user being featured visibly in the program. For example, a home user is shown on the program and seen/heard by other users as the homer user becomes a subject of interactive exchanges via the venue. In this way, the home user becomes a stimulus for other users to exchange potentially valuable sampling data that may be relevant to people, goods and/or services associated with the venue and corresponding database(s).

In an embodiment, Internet-based social networking sites, and other sites which are evaluated by users, and where users interact with each other improve as a function of at least trait and/or preference information submissions, particularly with regard to genetic-related information. In this embodiment, individual users transmit genetic and/or other biological information to a database, including from data that were sampled by one or more modules operating in tandem with at least aspects of the site/venue(s).

In one example, a user's biological sample (e.g., saliva, urine, blood or the like) is obtained via a home sampling kit (or other data gathering means) and that is linked to a computing device. The computing device uses the sample to identify various kinds of information related to an individual user. In one example, information related to blood-sugar levels is stored in a database. A user transmits information based on the user's biological sample and a determination is made that the user has a high blood-sugar level. The user is guided, via the site, to messages, such as in e-mail, message boards, or other electronic interactive options. Accordingly, a physical characteristic of the user, including related to a trait, can be at least partially inferred from data relating to the biological sample, and the characteristic is usable to lead the user's interest to something or somewhere of interest, based on diabetic-related data, blood-sugar levels, or other aspects deemed similar or dissimilar to the user. In one embodiment, the user is led to somewhere or something to connect the user with other(s) in a social network. Adrenaline is another example, demonstrative of many others, of biological levels and/or aspects to be sampled for extracting selectively relevant data for Internet searching and/or social networking, or other purpose associated with the site venue according to the teachings herein.

In one embodiment involving genetic sampling, a genetic fluid sampling module is used with known genetic sampling technology, for example, to extract at least one data point associated with the individual from which the genetic material came. This results in information related to at least one trait of the individual, such as a propensity to develop a certain disease, or inclination toward one or more genetically linked behavioral traits, such as aggression.

Information derived from health, biological and/or physical samples may be provided to supply comparable data, such as genetic marker information, relative to the user. Alternatively, health related issues and/or attributes obtained previously or by separate step(s) provide and/or supplement physical and/or biological information gathered directly by devices operable to sample material from a user.

Referring to the drawings, in which like reference numerals refer to like elements, FIG. 1 shows an example hardware arrangement in an embodiment and referred to generally as system 100. In the embodiment shown in FIG. 1, system 100 comprises at least one information processor 102 (configured to operate as an Internet web server and database file server) adapted to access communication network 106 and communicate with user workstation(s) 104. Sampling device 105 is operable to obtain physical, biological or genetic material from an organism. Device 105 may be scaleable for various environments, including domestic homes or offices or medical centers and hospitals. Device 105 couples to information processor 102 or workstation 104, either physically or wirelessly and may be operable to communicate over communication network 106. User workstations 104 and information processor(s) 102 communicate via the known communications protocol, Transmission Control Protocol/Internet Protocol "TCP/IP." In this way, content can be transmitted to and from the devices 102 and 104, and commands can be executed to enable the various functions described herein.

As used herein, the term, "module" refers, generally, to one or more discrete components that contribute to the effectiveness of the teachings herein. Modules can operate or, alternatively, depend upon one or more other modules in order to function.

Information processors 102 and user workstation 104 are any devices that are capable of sending and receiving data across communication network 106, e.g., mainframe computers, mini computers, personal computers, laptop computers, a personal digital assistants (PDA) and Internet access devices such as Web TV. In addition, information processors 102 and user workstation 104 may be equipped with a web browser, such as MICROSOFT INTERNET EXPLORER, NETSCAPE NAVIGATOR, MOZILLA FIRREFOX or the like. Thus, as envisioned herein, information processor 102 and/or user workstation 104 are devices that can communicate over a network and can be operated anywhere, including, for example, moving vehicles.

The nature of the teachings herein is such that one skilled in the art of writing computer executable code (i.e., software) can implement the described functions using one or more of a combination of popular computer programming languages and developing environments including, but not limited to C, C++, Visual Basic, JAVA, PHP, HTML, XML, ACTIVE SERVER PAGES, JAVA server pages, servlets, and a plurality web site development applications.

For example, data may be configured in a MICROSOFT EXCEL spreadsheet file, as a comma delimited ASCII text file, as a MICROSOFT SQL SERVER compatible table file (e.g., MS-ACCESS table), or the like. In another embodiment, data may be formatted as an image file (e.g., TIFF, JPG, BMP, GIF, or the like). In yet another embodiment, data may be stored in an ADOBE ACROBAT PDF file. One or more data formatting and/or normalization routines are provided that manage data received from one or a plurality of sources. In another example, data are received that are provided in a particular format (e.g., MICROSOFT EXCEL), and programming routines are executed that convert the data to another formatted (e.g., ASCII comma-delimited text or XML).

It is contemplated herein that any suitable operating system can be used on user workstations 104 and information processor 102, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, MAC OS, UNIX, LINUX, PALM OS, POCKET PC or any other suitable operating system. Of course, one skilled in the art will recognize that other software applications are available in accordance with the teachings herein, including, for example, via JAVA, JAVA Script, Action Script, Swish, or the like.

Moreover, a plurality of data file types is envisioned herein. For example, various suitable multi-media file types are supported, including (but not limited to) JPEG, BMP, GIF, TIFF, MPEG, AVI, SWF, RAW or the like (as known to those skilled in the art).

Figure 2:
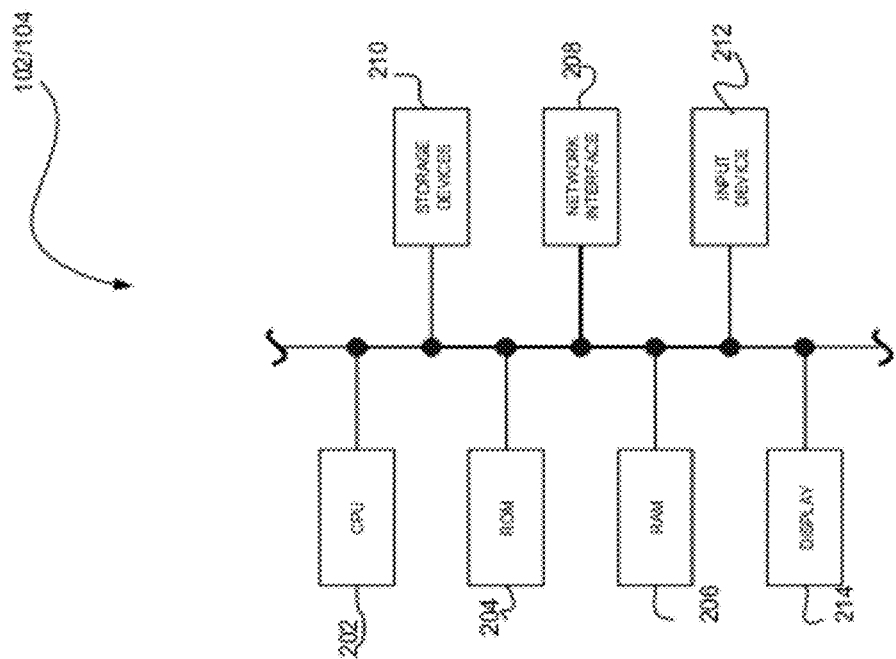
FIG. 2 illustrates the functional elements of user workstation and/or information processor.

FIG. 2 illustrates the functional elements of user workstation 104 and/or information processor 102 and that include one or more central processing units (CPU) 202 used to execute software code and control the operation of computing devices 102/104, read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code, databases and application data, one or more input devices 212 such as a keyboard, mouse, track ball, microphone and the like, and a display 214.

The various components of information processor 102 and/or user workstation 104 need not be physically contained within the same chassis or even located in a single location. For example, storage device 210 may be located at a site which is remote from the remaining elements of information processor 102 or user workstation 104, and may even be connected to CPU 202 across communication network 106 via network interface 208. Information processor 102 includes a memory equipped with sufficient storage to provide the necessary databases, forums, and other community services as well as acting as a web server for communicating hypertext markup language (HTML), FLASH, Action Script, Java, Active Server Pages, Active-X control programs on user workstation 104. Information processors 102 are arranged with components, for example, those shown in FIG. 2, suitable for the expected operating environment of information processor 102. The CPU(s) 202, network interface(s) 208 and memory and storage devices are selected to ensure that capacities are arranged to accommodate expected demand.

In a preferred embodiment, a system and method are provided that enable interactive exchange of information between users, such as via an Internet web site provided on information processor 102. The web site may prompt users for search requests for information that regard preference information of users of the web site. For example, a text box, drop down list, bullet list, or other graphical screen control is provided for the searching user to submit the request. Other familiar input techniques are provided, including but not limited to verbal commands which are received by a system module, which may be converted by another system aspect to be recognizable, sortable data. Information processor 102 is in operable communication with one or more databases that is accessed in connection with the teachings herein.

The database(s) store information related to traits and preferences of users of the web site. In addition, the database(s) store solicitations of information by providers of goods of services, including advertisers. Such solicitations may regard preferences of particular users of the web site. For example, a seller of FORD MUSTANGS may want to know preference of white males between the ages of 35-40, in order to advertise to that particular demographic. Thus, the teachings herein provide commercial benefits. Moreover, solicitations received from the providers are associated with one or more criteria in the database. Further, groups of users are defined according to predefined standards including, for example, criteria associated with the solicitations, and traits and preferences of the respective users.

In response to a search request submitted by a user, information processor 102 retrieves information from the data base(s), and formats and transmits the information for the requesting user. In one embodiment, the response to the search request from information processor 102 is made in exchange for information received from the user. In addition to responsive information provided to the user in response to the search request, information processor 102 prompts the user to conduct a subsequent search for information that relates to a second group of users.

In an embodiment, information submitted by the user is provided to one or more individuals in a group of users, and, in response, the individual(s) modify their preference information. In this way, information in the database evolves, as users review information about each other and refine their preferences, accordingly.

As noted above and in an embodiment, information related to genetic biological or physical samples is uploaded and stored in the database. The sample may be obtained in various ways, including via sampling device 105. Moreover, information related to a sample, for example, related to an individual is uploaded and information regarding the individual is matched with similar information stored in the database. Other users may review the information stored in the database, and may further discern and communicate with other users independently, or, alternatively, may be steered to each other via automatic processes executed on information processor 102. Such learning and communication may result in forging new relationships, new opinions and new preferences. In one embodiment, the preference information relates to a product or service offered for sale.

In an alternative embodiment, a request module is provided via information processor 102 that prompts for and receives requests for information related to genetic, biological and/or physical traits.

Accordingly and in various embodiments, users provide information, including relating to biological material that is stored in a database. The user-provided material can be analyzed by information processor 102, user workstation 104 or some other computing device to provide genetic/biological or other trait-based information. The information is used by information processor 102 to derive attributes of the user, including, for example, trait-based information related to the user. The trait-based information derived from the sample can be used to provide trait-based parameters in a search submitted by the user. Moreover, one or more search parameters used in the user's search include trait-based information derived from a plurality of samples submitted from a plurality of users. Further, and as noted above in connection with an alternative embodiment, information related to a single user can affect or otherwise modify preference-based data provided to other users.

In one embodiment, some trait-based criteria stored in the database is representative of a user, and other trait-based criteria is representative of other users. Information solicited from a user may relate the user's respective trait-based information and/or to other users' trait-based information. Other criteria determined by a proprietor of information processor 102, such as requested by providers of goods and services, may be solicited from a user. Moreover, at least some of the trait-based criteria is affected by at least other of the trait-based criteria.

The database that is in communication with information processor 102 stores information regarding providers of goods of services, including advertisers. For example, information representing the goods and services offered by providers is stored in the database. In one embodiment, information is submitted by a user of an Internet web site provided by information processor 102 in exchange for acquiring one or more goods and services offered by the one or more providers. The kinds of information submitted by the user in exchange for a good or service may correspond to requests by the provider. For example, an on-line music distributor desires to know particular musical tastes of a demographic, such as 21-25 year old males, and offers a free download of music to a user who submits detailed information related thereto. In one embodiment, particular search options that are provided to a user relate to or are impacted by criteria or requests for data by the providers of the goods and services. In this way, users who search for information at least partially support the interests of providers of goods or services, including advertisers thereof, because particular search options may be affected by those interests.

In one embodiment, after an initial search for information is made by a user, data requests by providers of goods and services affect search options provided to the user in connection with a subsequent search for information that relates to a second group of users.

In addition, users searching for information may include trait-based criteria in the search. In one embodiment, one or more traits selected by one or more other featured users affects the user's search, including the trait-based criteria used for the search. In other words, criteria used for searching, including trait-based criteria, may be impacted or otherwise affected by the at least one other featured user's selected traits. Moreover, information solicited from and/or provided by a user relates to at least one other featured user, and further to particular criteria selected or otherwise determined by the proprietor of information processor 102.

In response to a user's search, information that is provided from the database is, in one embodiment, based upon a relevance value that is determined by not only the particular search criteria submitted by the user, but also in connection with a degree of relevance of the information solicited from and/or submitted by the user. In one embodiment, information submitted by the user that is particularly relevant to criteria determined by the proprietor of information processor 102, may affect a relevance value and impact the kinds and perhaps the quality of the search results that are returned to the user in response to the search. In this way, many parties' interests are served by the teaching herein. Providers of goods and services identify particular kinds of information they desire, the proprietor of information processor 102 uses that information to gauge the degree to which information received from a user is relevant to the providers' interests. By providing particularly relevant information to information processor 102, the user who searches for information receives quality search results, the providers of goods and services receive information tailored to their particular desires, e.g., for market research, and the proprietor of information processor 102 succeeds in his business.

The information provided to the user and based on the relevance can be provided in various ways. In one embodiment, the information is provided directly in response to the user's search. In another embodiment, the information is provided directly in response to the information received from the user related to a biological sample. In another embodiment, the information is provided in second search results that, for example, may be similar to results provided directly in response to the user's search. The second search results may allow for refinement and revision of comparison searches that provide similar results and/or results for a revised or different group (and/or ranking) of individuals represented within the database. For example, searching for men who meet a threshold of aggressiveness might result in an unanticipated search of women of a minimum degree of aggressiveness (or passiveness). Notwithstanding the way or time that information related to a respective relevance determined by the proprietor of information processor 102 is provided to a user, various objectives are met, including responding to the user's particular search criteria, possibly including trait-based criteria, as well as objectives related to providers of goods and services, and implemented in accordance with the teachings herein by the proprietor of information processor 102.

As noted above, at least one featured user, other than the searching user, may impact the search criteria for the user. Moreover and in an embodiment, a focus group of users provide information that is relevant to goods and services that are searched for by the users, and/or are offered by providers.

In addition to providing search results directed a request regarding at least trait and/or preference information, unsolicited information may be provided at least in part related to search results that were sought by a user. In one embodiment, unsolicited information is provided from the database and presented as search results related to a demographic other than a demographic indicated of interest by the user. The priorities of at least one advertiser in targeting a user may directly influence secondary search results from the database presented to a user, and appearing relevant to the user's search, when the degree of relevance is at least partly a function of meeting objectives of at least one advertiser.

In one embodiment, unsolicited information is provided in response to a tangential search that involves at least areas of preference and/or demographics other than those defined by the user in a first search. Redirecting the user's attention to a new area of interest/preference serves revenue-generating interests of the proprietor of information processor 102, as well as the advertising targeting interest of at least one advertiser. Further, in redirecting the user's attention from his original demographic of interest, a user may be exposed to information derived from not only data providers representing a different demographic within the database accessible by information processor 102, but the user may be provided with information derived from an entirely different group of individuals. The information from these individuals may be different than the information that would have otherwise been provided from individuals in the user's original demographic of interest.

For example, a user initially sets out to find out what sort of gift to find for a prospective female companion, based on preference information from comparable females represented within the venue/site's database. After receiving information related to this request, the user may automatically receive follow-up preference information, for example, related to the type of companion such females have indicated they find to be "most romantic." As a function of priorities of the proprietor of information processor 102, including as driven by advertiser or other paying customer goals, the user may be exposed to search results related to car preferences of men whom these females find to be most romantic, and/or otherwise relevant to these females.

A variety of follow-up search results may be acceptably relevant to the user while the user may be unaware that at least one selected advertiser is interested in the user. Had the user been provided, instead, with information about men whom such women find to be most "attractive" rather than "romantic," for example, then search results serving the interests of the highest paying or higher paying advertisers would have been displayed, such as search results serving the interest of a sporting goods manufacturer.

This example demonstrates a priority of editorial integrity and an illusion of control for a user. The user was presented with information related to men and automobiles, rather than sporting goods. The choice to assemble and provide information related to automobiles as opposed to sporting goods in follow-up, unsolicited search results is based at least partially on at least one criterium unrelated to the user and/or the user's initial search. The effect of this priority may affect the revenue-generating potential of the site, initially, by featuring unsolicited search results from a lesser paying advertiser. However, the user is more likely to continue his session with information processor 102 and to remain receptive to more volleys of information from the site deems to be more valuable as a long-term priority relative to this user and to the site, overall.

This subtle control of providing solicited and unsolicited search results to a user is a powerful marketing and advertising vehicle provided by the teachings herein. Users are directed to new areas of preference they had not initially sought to consider, as well as being directed to information from demographics and even distinct groups of individuals that were initially not defined by that user. Moreover, subjective associations with the user's first search criteria address advertiser priorities and user interest to meet the revenue potential of the site via a plurality of layered searches. Numerous searches defined by a user may occur while a user continually interacts with the site or other interactive vehicle provided by information processor 102, during a single session. Further, numerous volleys of unsolicited information including information from both individual data providers and advertisers, may occur during a single session that may have begun with a search defining a trait-based group or demographic of interest. Indeed, users may not only be steered toward information that benefit advertisers and/or the proprietor of information processor 102, but may discover information, people and other options of discovered interest otherwise not likely to have occurred without the biased information integrated into the interactive session. The editorial integrity priority of the venue may employ correlation operability to present options of likely interest to a user in this way, which may or may not be revenue-generating or advertiser influenced, but are provided as an interest proposing and/or people proposing interactive engine aspect leading to actual new or awakened interest in things and/or people, including other users.

In an embodiment, information initially provided from the user to the venue includes biological information related to the user, such as genetic information, and which was extracted by the user at home via sampling device 105. Further, other databases may be referenced, such as to feature information, such as credit information or search engine history data related to the user, and that are accessed with or without the awareness of the user to establish a profile of the user and/or the initial areas and people of interest to that user.

Advertisers who pay to be featured and/or to receive information regarding users are served by the ability of the discreet targeted advertising and data-gathering objectives by a range of information related to user traits and/or preferences. Information related to users extracted from biological aspects of users, for example, may greatly enhance both the basis of advertising targeting of users and/or venue criteria and priorities for maintaining user relevance. This may enhance the illusion of control of a user over a search experience and social interactions, when passively collected information, such as genetic data or ancillary search engine data relative to the user, educates the present system beyond conventional responsive data-gathering options, such as pulldown screens and keyed information from a user. For example, a genetic marker indicating aggression is further informative about a likelihood of the user to be interested in fast cars or a high risk sports product. This information is usable in connection with advertising that is presented to a user and/or database information that is provided to a user and that maintains interest in continuing an interactive session.

Further, individuals whom the user discovers by way of social networking sites or other venues in accordance with the teachings herein may be affected by search results, solicited and/or unsolicited, leading to groups of individuals who may be featured within database information. These individuals may be other users, and may also be available to interact with the user, such as by e-mail, message boarding or other electronic dialogue and communication options.

In one example, a user provides responsive and biological information to the system electronically. The biological information is based on a biological sample obtained via a component of the system employed by a user at home. In this example, a male user indicates that he is searching for a specific type of female in relation to specific area of interest, such as dating preferences. During a search session with information processor 102, the user is prompted to provide personal preference information related to himself in-between volleys of search result data both requested by the user and provided by the system without request from the user. In this example, the user is unaware that a genetic marker of the system indicates at least some trait information that has been deemed to suggest a high probability that the user is homosexual. This conclusion need not come from a marker directly related to sexual preference, as ancillary traits have been determined to occur with high frequency in relation to users who have been identified or have identified themselves to be homosexual.

Continuing with this example, as a result of this passive information analysis, the user is prompted to consider information and/or contact options relative to a selected group of other men. These options may or may not relate to the user's initial preference area of dating. The options provide system-relevant information pertaining to the user, even though not provided responsively by the user. System-extracted information such as this may direct the eventual path of a user's search, as well as selections of advertising solicitations, social interactions, and even result in new or unanticipated areas of self-discovery.

One of the virtues of the teachings herein is an unthreatening environment in which such revelations and social networking, and targeted advertising may occur. Screen names and other vehicles for identity masking and/or anonymity allow for a safe distance from disclosure to others and/or criticism from others, or other areas of user concern which may occur in actual face-to-face social settings. Further, products and services that a user might not set out to search for due to fear or lack of self-awareness, may become suggested to the user as a function of unsolicited information provided by information processor 102. Such unsolicited information may be based at least in part on information provided to the system from, for example, genetic markers or other user relevant data not provided overtly by the user.

Other examples of known genetic markers that may lead to expose a user to other users for potential social interaction include disease or other health related markers, markers, such as diabetes, a propensity for ovarian cancer or the like. Availability to such revelations, through passive search results or through actual system data indicating the potential discoveries from genetic data, are other options available to be provided to a user, directly.

In one embodiment, a user searches for preference information about others at least in part based on trait information. A user may identify and interact with, such as through messages, at least one other individual as a result of a layered search involving trait and preference information. Moreover, a new advertising platform is provided that may involve several rounds of solicited and/or unsolicited factual information to be provided to a user to discreetly guide or steer the user to targeted advertising and/or data gathering opportunities that are deemed most lucrative to the site or venue, as weighed against search experience priorities. Such priorities may include maintaining user relevance and/or interest and/or impression of control over the user's search.

For example, a user with the username John, sets out an initial search for preference information related to the travel preferences of a female of interest to him. By way of both responsive information provided by John and passive information about John (gleaned from genetic information submitted by John), and also from preferences that John has demonstrated in searches for information via external interactive services that have been accessed by information processor 102. John's traits/preferences relative to the objectives of advertisers have been determined to provide a powerful opportunity to sell a specific range of automobiles and/or information to/from John. At least one advertising client of the site has paid a premium for both information and access to particular demographics of site users.

Continuing with this example, John was not planning to conduct an Internet search of products for his own use. Variables within data management created as special operability under the present system, allow the database to be accessed in stages. Selective data relayed to John according to a pathway for revenue-bearing advertising maintains an impression of a high degree of user relevance for John, even though the advertisements are affected by system parameters. In this particular example, John's search related to his female interest led to unsolicited search results listing the top five "sexiest automobile models" to women the system, using criteria not disclosed to John, has deemed to be similar to the woman of interest to John.

Thus and continuing with this example and embodiment, subsequent stage(s) provide automobile factual information related to men. Specifically, the system has presented information related to men that are presented as being of at least a high degree of interest to women similar to those of interest to John. In this way, the system has subtly steered John from travel curiosity related to women over to automobile curiosity related to a type of men. Such subtle maneuvering of interest, and demographics searched, is exemplary of how an impression of user control and user choice is maintained, while allowing advertising and other priorities to impact a user's search experience. This occurs such that the searcher takes an interest in preference data from an entirely different group of individuals, not merely a new demographic, from those who provided data for initial search results in response to an initial information request.

A virtually limitless range of options are provided, which weigh user impressions and advertiser objectives and priorities. Some searches in accordance with the teachings herein involve many subsequent volleys of unsolicited information, amidst potentially revised requests from the user for information directly, similar to Global Positioning system ("GPS") devices revise route options as a driver chooses not to accept initially provided directions. The goal of this GPS-like search guidance is to direct the user to his destination, even if through a more circuitous route than originally deemed by the system. That search results destination itself can be thought of as a "place" that is selected as a weighing function of user, advertiser and search experience criteria. Further, this "place" is likely not a place the user would have randomly or intentionally gone without influences and determinations, as set forth herein. Individuals whom the user may find of interest and interact with, as a result of this process, would likely not have been individuals and/or users the user would have sought or discovered based exclusively on his initial areas of interest.

This continual managing and reassessing of search options presented to a user by the system include intuitive variables programmable within data managing aspects of the system. The quality and data gathering bases affect system operability and database management directly, thereby influencing the value of options to both users and advertisers. The more discreet and reliable the data management is, the more effective the resulting exchange of information will be for at least users and advertisers.

With regard to the social networking opportunities made possible by the teachings herein, individuals interact individually and/or collectively, and may affect various forms of content, including video content that relate to an aspect of an Internet site, for example, to experience a new range and latitude of options. In one example, a single video production is affected by individuals exchanging interactive information and even supplying video, with a venue providing a link to and display of such a video production. For example, the live television program, AMERICAN IDOL, includes participants that affect show content, such as by selecting a winning contestant.

Herein, further aspects are introduced when system users, identified by trait and preference information, literally become featured video components of the program. For example, home users expressing preferences that are advantageous to the production and/or advertisers of the production, may be featured on the video program, live, as guest judges or home auditioning singers. In this way the multimedia venue of the present system allows for the show to be seen live on television, for example, while also featured at least on an Internet site as streaming video.

The interactivity a given user has had with the system, even exchanging data as simple as by demonstrating availability to be featured live, may lead to such a user becoming a featured content aspect of the show, which is seen by at least a plurality of other users if not an entire television viewing audience as well. In this way, a system user to become a featured stimulus for information, data sampling, advertising opportunities and other system and/or viewer and/or user relevant value aspects.

Figure 3:
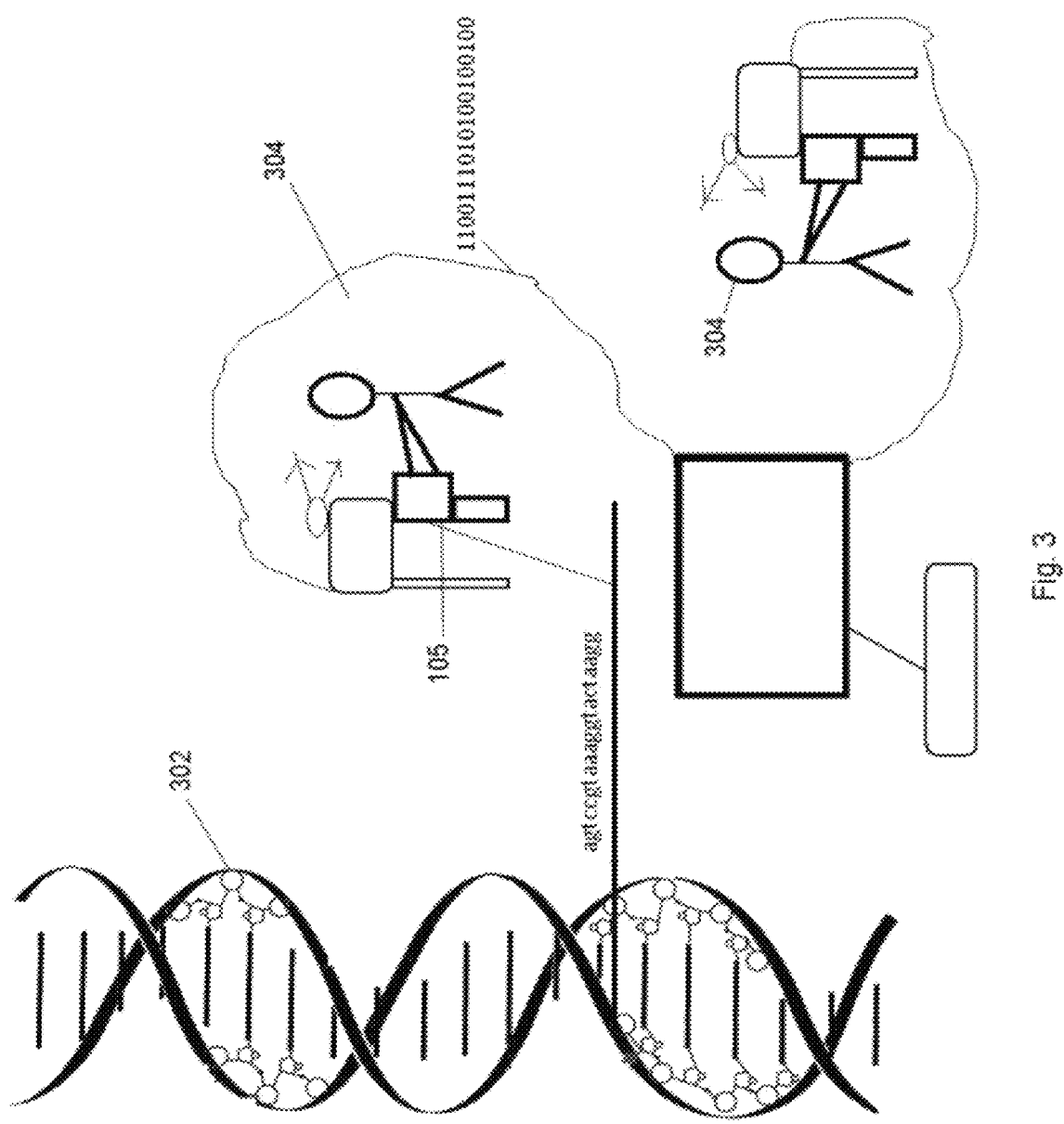
FIG. 3 illustrates genetic information related to a user, pursuant to an embodiment.

Referring to the figures, FIG. 3 illustrates genetic information 302 related to a user 304, for at least searching for information and/or individuals in relation to at least trait information in one or more demographics (or person(s)) of interest or relevance to user 304 by the user and/or system.

Figure 4:
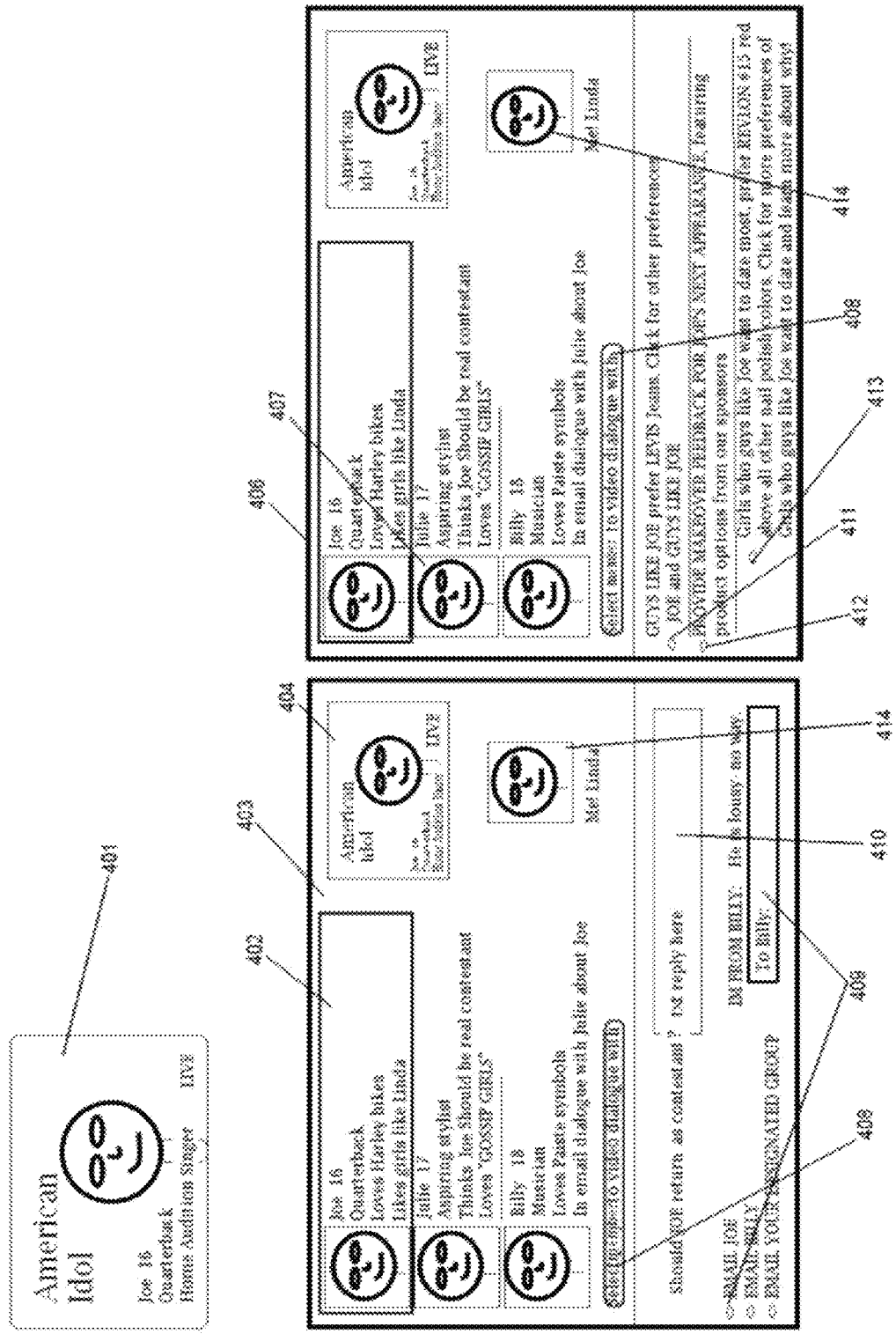
FIG. 4 illustrates a multimedia configuration of an embodiment, featuring a live television show and Internet site.

FIG. 4 illustrates a multimedia configuration of an embodiment, featuring a live television show and Internet site. In the example shown in FIG. 4, the known program AMERICAN IDOL is shown, although not intended to limit applications of the systems and methods herein. In particular, FIG. 4 illustrates a linked video program 401 and interactive site 403 operability of at least the computing and data managing features of the teachings herein. The example shown in FIG. 4 includes the familiar, live network program and an interactive venue, AMERICAN IDOL. Live program 401 presented, for example, in a on hour format, features a video supplied over the Internet by participant/user JOE, who is a member of the AMERICAN IDOL interactive venue. This live image is provided at least partially via a web-cam linked to JOE's computer, though other participants, such as JULIE 407 are also providing video of themselves by way of a PDA device, in her case, an IPHONE. The live program is also provided, in this example, at least through cable television systems to viewers. The show is also displayed via streaming video (or other interactive image delivery options) in live show site display window 404.

JOE is displayed to venue member LINDA 407 and to all interactive participants via the Internet (and related wireless connections where involved) with JOE's 402 profile information and an image representing JOE 406. Though often just a still image, this profile visual is, in this example, a small display of streaming video from JOE's 406 web-cam. Interactivity for providing responsive and informative information to the venue from each user, such as votes related to featured performers or other responses that affect show content, is represented by responsive field 410. Field 410 may be text, pull down screen, audio response, or other suitable option for a user to input and convey information for potential use in collective and/or individual response data consideration by the venue operator.

This responsive information may also pertain to survey information related to advertisers, products, services, those paying for preference sampling of selected users and other revenue generating and venue benefitting purposes. Such users may be targeted to provide responsive information individually or collectively, factoring at least a user's respective trait and/or preference information, including information as featured in their profiles. Further, information related to show content or other responsive information may inform subsequent requests for information and/or interactive involvement in the venue and potentially the show. For example, JOE was selected for inclusion as a home auditioning member based in part on his previous responsive information via the site. He is now, as a result, being featured to millions of viewers and thousands of home Internet users at least, and based on other user's responsive information related to him. JOE may be brought in as an actual live performer at AMERICAN IDOL in Hollywood to perform on-stage with the other studio performers in subsequent live episodes.

Interactive options between users are demonstrated by, for example instant messaging, texting option, and member email option 409, as well as 2-way video chat initiation option 408. Other options for locating and connecting with users of a site are available, including locating users based on trait and or preference information searches related to the show content, JOE 406, or other criteria not directly related to the video program/show. Such interactive connections may provide further operability for the venue to select surprise video participants in the shows from interacting users, for example. Further, the trait and preference information exchanged, at least in part related to the show and/or users featured within the show i.e., live video program may inform advertising targeting in the form of unsolicited information transmitted to user(s). Further information gathering options for users may serve the objectives of users and advertisers alike, as demonstrated by option 411, wherein a user interested in learning more about people like the featured home auditioning member, JOE, provides an opportunity for the brand LEVI's to target a high-value potential client, and further allows the venue to provide linking to more layers of searching and information, initiated by interest generated by JOE, and allowing for other information exchange and advertising possibilities of value to the venue.

Maintaining user relevance and engaging users in the creative process, for example, allows for numerous discreet and unique content-relevant advertising opportunities for many or few targeted users. Interactive option 412 enable user(s) to provide feedback to "make-over" the featured performer, JOE, at least in part involving products and/or services of paying venue advertisers. Such options may involve ancillary computing operability for user gratification, including unique media created for a user as a result of interactive options selected and/or created by/for a user. For example, and as alluded to above, the "make-over" of home auditioning user, JOE, involve selections, potentially featuring products of advertisers, being featured on at least a visual of JOE. A final visual of JOE's revised appearance is provided to one or more participants, such as others in a "member group." Such "make-over" information may also, for example, contribute to additional individual or collective information being provided for Joe or others including home Internet users to respond and/or react to, to agree with, to refute, or the like. Such information may further affect actual events on the show, such as a subsequent styling of JOE should be selected to appear on the show, in-studio.

Further, advertiser relevant responsive information pertaining to JOE may result in an opportunity for an advertiser's product(s) to be featured in the show, made show-relevant by way of relevance to JOE or other content elements, and/or at least one user's responsive information. Such user(s) may even be pulled into a show by way of their responsive information, and/or their own video stream may be featured on the show. This interactive approach, for example, may allow LINDA 414, to be selected by the venue by way of her responsive information, including her own trait and preference data which may include genetic or other user provided biological information for interacting with JOE or others "on the air," and/or featured within the content of the live show provided on at least the Internet venue to other users, (potentially also to millions over other media distribution aspects, such as cable and/or satellite television).

Further, the steering and redirecting of user attention operability enable the venue to guide users to valuable and/or relevant information for them, or their areas of interest as determined by the venue or is demonstrated by option 413. This option for users allows show content aspects, in this example JOE, to lead females to advertising information that is presented in relation to, for example, JOE. In this example, the content deemed potentially interesting to the user, LINDA 414, and advertising client(s) of the venue, such as paying client REVLON. Data management of the venue may weigh any of these or other factors, relative to aspects including user interest and perception of user control, advertiser(s) targeting goals and revenue-generating potential for the venue, as well as show content.

Figure 5:
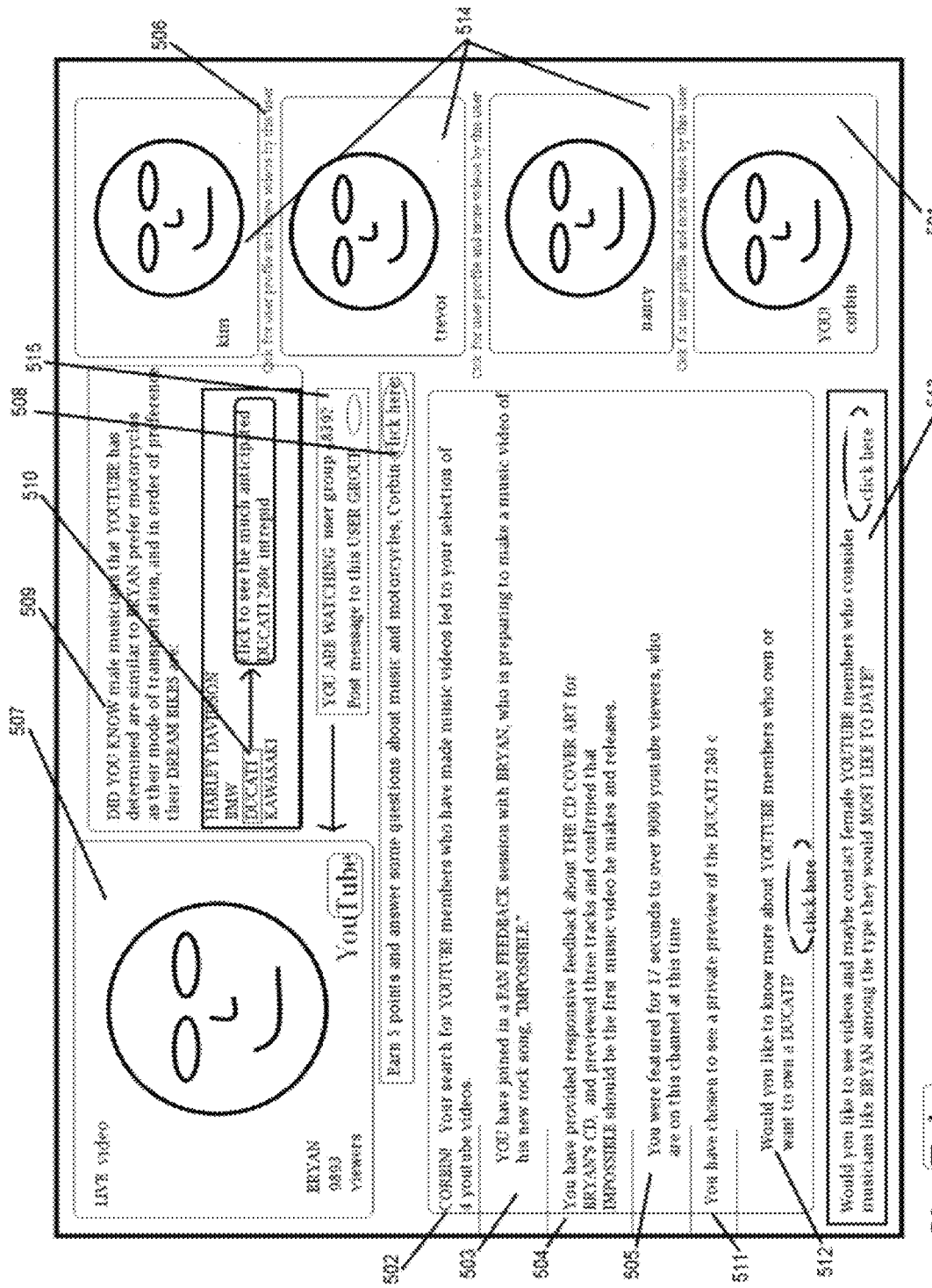
FIG. 5 illustrates an embodiment related to social networking and enhanced searching options, in accordance with an embodiment.

FIG. 5 illustrates an example embodiment related to social networking and enhanced searching options including at least preference information leading to the discovery of videos and interactive dialogue and video exchange between members of a site/venue. Herein, the example of a video sharing site, YOUTUBE, is illustrated at a moment in time as seen by a user, with some of the aspects of searching and social networking options displayed. In the example shown in FIG. 5, YOUTUBE user CORBIN (screen-name) 501, logged on with the interest of locating some music videos made by musician members (video posters) of YOUTUBE 502. On being presented with a range, CORBIN entered specific trait and preference criteria related to the musician members, which resulted in a sorting of videos based on users, resulting in three featured videos. Used herein, the term "search criteria" refers generally to the variables affecting search selections, including for aspects of users or videos, or both.

In CORBIN's YOUTUBE session shown in FIG. 5, CORBIN has provided specific preference information resulting in the selection of three videos. From one of these, he chooses to review profile data about user KIM 506, and has email interaction to/from her, subsequently. From these videos he can watch other videos by those three featured videomakers, also, if he so chooses. The venue has factored, in the example shown in FIG. 5, traits and preferences of CORBIN from his YOUTUBE history and optionally also included ancillary information provided or allowed for the venue to access by CORBIN. In the example in FIG. 5, CORBIN's genetic information and his search engine and other accessible database sites' data have been factored (not shown). Based on some or all or this collected information, YOUTUBE has invited CORBIN to join a live feedback session 503, with musician BRYAN 507. In this example, BRYAN is sponsored by SONY MUSIC, albeit such sessions need not feature paying clients of the venue. CORBIN is also offered incentives to participate in the session with credits, in this instance allowing for free downloads of a selected amount of premium media typically offered in the non-free aspect of the site, including new movies, among other options. Such opportunities may be presented in many ways relevant to venue objectives 508.

During this session, based on CORBIN's responsive information and history of interaction with the venue, he and twenty eight other users have been selected to provide feedback related to BRYAN'S new CD's cover art 504. In CORBIN's case, he will receive YOUTUBE credits for this information. In fact, without expectation, CORBIN via his web cam, is pulled into the live video show, in this case the web-discussion/feedback session 505 with BRYAN. CORBIN typically interacts with other selected YOUTUBE members/users via web-cam as well. During the time CORBIN is pulled "onto the video/show," seen by almost 10,000 other YOUTUBE users both live and as viewed later, CORBIN discussed his cover art preference and idea(s,) and other user's then interacted with each other related to CORBIN's feedback including via message board operability 506. They even sent CORBIN messages directly, as function of the social networking aspect of this YOUTUBE venue.

Based on CORBIN's responsive information related to BRYAN and from CORBIN's initial profile (and passive profile information factored by the venue selectively) database operability determination is made that advertiser DUCATI MOTORCYCLES would be of both site revenue potential and acceptable relevance and interest to CORBIN to present 509. DUCATI's relevance to BRYAN is the identifying opportunity used to present advertising motivated information to CORBIN. A motorcycle based preference factual information list is provided, as linked to relevance to BRYAN 507, whom CORBIN is demonstrating emulation interest in. Such new interest might lead to other advertising/revenue opportunities for the venue, not initially available relative to CORBIN. This may include things he might buy as a gift for a female of interest as a result of learning more about BRYAN 513, for example.

The advertiser is not the first most preferred bike of men like BRYAN, by venue design. Another determination of "similarity to Bryan" by the venue would have indeed put DUCATI as the first listed. However, a determination of CORBIN based on user impression programming operability has determined that the "other determination" of similarity to BRYAN, leading to DUCATI not being the first listed, will more likely lead to CORBIN selecting the DUCATI link and introduction to the new model of bike. Past research and/or search data has provided the venue with psychographic data of "men like CORBIN," in relation to such solicitations. These men react strongly to lack of control and manipulation, so the advertiser being listed third in the preference list in fact has a 34% higher chance of CORBIN'S "type" (relative to specific psychographic aspects) linking to the client site, as offered 510.

In this hypothetical search example, indeed CORBIN does link to the DUCATI site and model introduction solicitation as a result of this "discreet and right call" by the database management operability. Advertiser data and user data are available to the data-managing system aspect in making these velvet-hammer advertising determinations. The value to advertisers enhanced herein is the critical selling value of "user acceptance and believability" of the info as well as the conversion rate of users solicited relative to those linking and or becoming buyers and/or closer to buying, relative to other advertising options available to brands. The advertiser itself may become the potential area of interest, in fact, when the user believes they have solicited and made occur, by their own control 512.

The operability enhancements thus provided to a site, such as YOUTUBE, include new means to locate both users and video product, which increases user interest in the site options and greatly enhances advertising and advertiser targeting options. Further, the addition of video product created by users relative to topics at least in part provoked by advertiser priorities, may lead to live and/or downloadable/streamable videos that may provoke advertising and data sampling (focus group) information from users or determined user groups, advantageous to such advertisers, for example. Collaboratively created videos also need not feature the users themselves, but may simply be video shot by them and provided in relation to the video content in which they are contributing, being subsequently provided specifically for other user and/or venue-determined user's to review and/or provide responsive information in relation to.

Providing bonuses and/or incentives may be provided for users to interact and/or provide information, such as video of themselves or other subject, relative to a site interaction. This is beneficial to revenue generating opportunities for the venue, including participating in video product or "shows" uniquely assembled and provided live and/or after recording to other users, at least some of these being based on and/or provoked by topics advantageous to selected advertiser(s). Further, data sampling of users and advertising opportunities are improved via profiling means including evaluation of users from profile information input by users and/or passive data extracted from biological sample(s) of users and/or passive information from external databases accessed and/or information gleaned from user interactions during YOUTUBE sessions. In relation to social networking, videos and or users of interest may be discovered by users who would have remained unknown to a user had the preference areas of interest to a user not been steered at least in part by advertiser influenced information.

These several sites/venues are used only as example initial platforms for some of the improvements provided by the present system and method.

Figure 6:
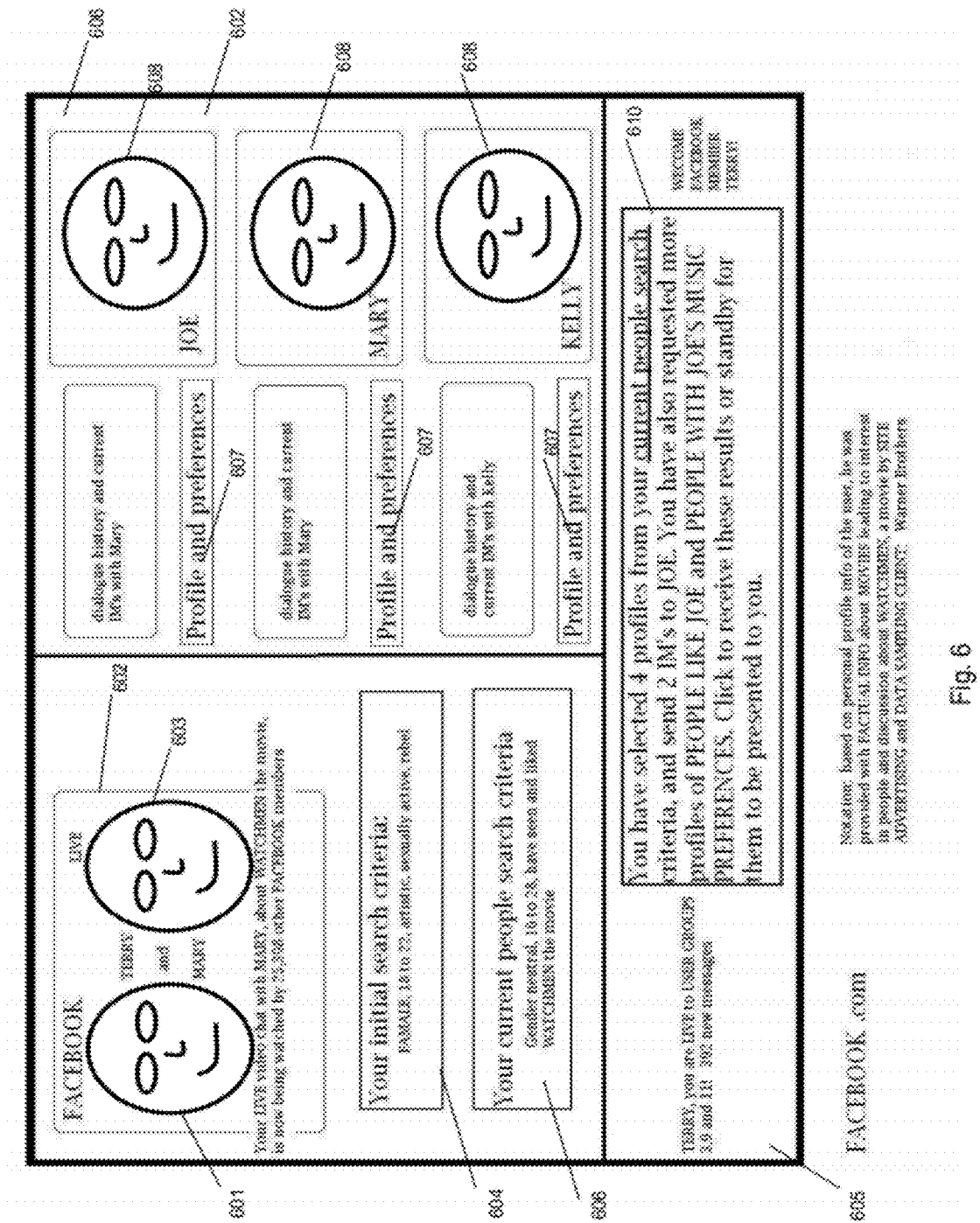
FIG. 6 illustrates an Internet-based interactive venue that incorporates video elements comprising and affected by users exchanging information with the venue.

FIG. 6 illustrates an Internet-based interactive venue that incorporates video elements comprising and affected by users exchanging information with the venue. In the example shown in FIG. 6, the familiar site FACEBOOK is employed as it might appear at given moment to a user, when the innovation(s) herein provided additional operability to that site and, accordingly, other such social networking based interactive forums and interactive destinations.

Referring to FIG. 6, the known Internet site, FACEBOOK, is featured as a venue improved by the teachings herein. Enhancing the current "locate friends by profile and picture" and information sharing operability of the FACEBOOK venue, searching and video involvement operability is demonstrated herein, as are powerful advertiser tools for targeting and subtly informing/selling to users as they search for and interact with other individuals.

FACEBOOK user, TERRY 601, is identified in this example of a snapshot of TERRY's home computer, as he dialogues by 2-way video web-cam operability with user MARY 603, in front of other FACEBOOK user/viewers 602. In this example of the wide range of user and advertiser value linking and factoring opportunities, information provided by at least TERRY met criteria of venue programming to selectively provide his video chat with MARY to a selected group(s) of other FACEBOOK users 602, deemed and/or expressing interest in them and/or their area of discussion, for example. Herein, the example of the objectives of advertiser WARNER BROTHERS and the searching and interacting data extracted from both TERRY and MARY in this case, (though one user's information is sufficient for such venue user affecting determinations,) has resulted in an initial search 604 for sexually related information by TERRY leading to a revised people-search and eventual connection with a member, (MARY) and discussion area related to the new movie, WATCHMEN, as demonstrated by Terry's revised searching criteria 606.

This revised searching criteria was the result of several rounds of unsolicited information provided to Terry by the venue, with the database managing objective determined by system operability to steer TERRY toward one of three potential advertisers while carefully maintaining TERRY's session, interest level and impression of control over his search. Based on each interaction from TERRY, the system provided two separate unsolicited data results leading TERRY from his interest in sexual data pertaining to certain females, through the adjacent preference area nightlife venues (of women of the age range of interest to TERRY) to the entertainment and specifically movie preferences of this group of men and women. Through this process, the third most lucrative advertiser option to the venue, WARNER BROTHERS, was presented within information to TERRY, as the other two selected advertiser options he may have been "steered" toward were deemed to jarring to the searching process to pursue first; namely, they would have required too many additional layers of unsolicited information volleys to quietly guide TERRY there within the venue-determined threshold of search/editorial relevance. Thus, the priority to avoid the perception of "selling" or manipulation by TERRY and potential termination of his FACEBOOK session, as a result, is demonstrated.

TERRY, in the example shown in FIG. 6, was presented with a group of users related to this revised searching criteria, involving the topic of WATCHMEN the movie. From this group, TERRY selected a random group of 3 members based on reviewing their profiles 607, and/or images 608, as memorialized in this snapshot as interactive report 606. Dialogue text with member of interest, MARY, provided responsive information useful for the venue operability to determine subsequent video dialogue with MARY would be advantageous for the venue to display to other user(s), or user groups 605. This impromptu "video program" featured on the site of a plurality of other users 602, serves in part as stimuli for other user(s) to provide further responsive information and/or provide their attention, to the benefit of at least the advertiser, WATCHMEN/WARNER BROTHERS. Other user profile information and/or responsive interactive information during their own FACEBOOK sessions provided all or part of the data for determination by the system/venue that they should be offered and/or provided with the two-way video interaction between TERRY and MARY 602.

Selectively, those accepting viewership of such video aspects created by the venue involving such users, and/or those providing data related to these or other stimuli, might receive incentives not limited to bonus points or credits redeemable or applicable toward other aspect of value to user(s.) These credits might be provided as a function of user time spent viewing an interaction, and/or providing responsive information to venue stimuli and/or direct requests for information, and/for other actions provided by user(s) whether solicited and/or not.

In this example, TERRY has further interest in user JOE, after seeing in his profile a music preference that interests TERRY. In fact, this leads to general interest by TERRY in JOE. In this case, his interest in emulating aspects of JOE, so TERRY accepts the option and/or access the option without solicitation to learn more about preferences and/or traits of "people like Joe." The latitude of for the venue of determining what criteria others are deemed similar to JOE, is in fact herein a function that includes the further weighing of other advertiser criteria relative to TERRY as a valued ad target of other paying clients of the venue; also relevant to the database in this instance is a preference/trait correlation determined between TERRY and JOE that as a function of the data managing operability of the searching program(s). TERRY is directed toward the next unsolicited revenue bearing information exchange, namely sports cars and client GENERAL MOTORS. The option of greater control over criteria for determining "people like Joe" 610 is an optional control provided to a user. The degree of control over criteria and thresholds for criteria for user relevance to be put in the hands of the user is an optional aspect of the computing operability and resulting venue controls/options presented to a user. The range of venue, advertiser-motivated choices and directional changes may likely be narrowed or at least impacted with each more narrow control over such searching options placed in the hands of users.

Even though THE GAP may have paid more to be the next advertiser featured within unsolicited information in relation to JOE and in targeting TERRY, the venue search experience determined to move toward automobiles, relative to not only revenue but TERRY and the critical impression of control and relevance by TERRY. As a result, TERRY stayed on his session long enough to be exposed to more advertising than otherwise would likely have occurred, had THE GAP been presented to TERRY in the more jarring "relevance" tangent that was anticipated by database managing operability.

Through this example, key improvements are demonstrated, including options for users of FACEBOOK and similar venues to discreetly identify and interact with other users of interest who would otherwise not likely to be identified from a massive collective membership. Advertisers enjoy new options to present messages and offers, including linking and buying options, to users via messages and information coated in the discreet relevance created and presented based on the user's own search criteria. Distinct media products, such as video programs featuring users, for example, may be created by venue and/or user determinations leading to at least user dialogue featured in video, presented to at least the participating users, and potentially other users who may or may not have requested access to such unique videos/program content.

Further, the ability for advertiser relevant information to be distributed in interactive video transmission and/or shared between users is a determination function and distinct value of the present system and method. The "editorial" nature and seemingly unsolicited discussion points of users dialoging about products/services of paying venue clients provides a powerful platform for advertising and data sampling of featured and other users, with topics seemingly generated naturally and organically by users. In fact, at least some of the discussions and featured videos will have been instigated by users being provided with information featuring paying clients, related at least loosely to their own interests and determined by their current search and/or user profile information, such as their traits and preferences and/or ancillary information collected from external sources relative to users.

In some cases, users may accrue incentives, such as usable credits or other acknowledgements of interest to a user, for interacting at least partially in relation to venue topic priorities. These user-involving interactions relative to advertisers are powerful platforms for advertiser messages and options to be accepted by consumers as unsolicited, impression-wise. Accordingly, these options are far likelier to be accepted by user-consumers as true, interesting and potentially worthwhile to act on. Advertising may be provided with relevance to a level that rivals and/or matches editorial, such as an article in a paper or a group of people chatting about something without benefit to anyone but those conversing. Much like the proverbial "shell game," the user believes and feels that he or she has chosen his/her own path to such information, and in fact solicited it, when in fact this may typically only be in part, if at all the case.

In yet another embodiment and in connection with social networking, participants/users, such as members or users of an Internet site, who interact are at least partially profiled based on "passive" information, including based on biological information that is sampled and submitted electronically, but not typed or input by user(s) in response to questions and/or prompts in data entry forms. Profiled users may be directly or indirectly, via multiple stages, directed to interactive options including voice and/or visual exchange with another user. For example, a selectively anonymous call might be connected to provide voice contact between interactive participants in accordance with user(s) criteria and/or system criteria.

These users may communicate with an awareness of each other's actual identity, may be aware of each other's screennames, or may be completely anonymous to each other. The users may interact in a subsequent context, depending upon their personal desires. For example, the users may engage in meetings, and/or request the system provide responsive information in tandem for future contact. Moreover, objectives of at least one paying party, such as an advertiser, may enable the parties to meet, which would have not otherwise been feasible without the voice and/or visual connectivity facilitated herein.

Moreover, biological information, including genetic information, about a user may inform or provide directly biased or incentivized connections between two or more users, thereby satisfying system-related objectives including objectives of paying clients/advertisers. For example, "credits" or other user valued reward(s) are provided for agreeing to interact with other user(s) by providing information or being passively sampled, or in some other way observed, and which the other user(s) may witness in a live context. Alternatively, information related to products/services presented by or otherwise related to the system may be collected via one or more interactive pathways that are set up by the system at least in part based on user(s) own social interactive and/or information seeking objectives. A user may be solicited to participate in a group interaction, or one-on-one interaction with another user, to gain reaction and/or preference data related to topics and/or stimuli potentially presented by the venue, system and/or site. Such interpersonal contact may further be made for the biased purposes of the venue, involving passive information related to user(s) to arrange such interactions, such as in cases where no passive information is received, and user inputted information defines the user(s) and corresponding profile, as well as the user's information and/or social connecting objectives and criteria. A range of awareness and willingness, and latitude in straying from the direct input instructions of a user is a function and option(s) of system configurations.

In another example embodiment, users agree to pre-arranged connectivity, or may be connected in an impromptu fashion, such as by surprise. For example, a film company may be interested in testing the potential of creative elements of a new movie that may or may not be completed. From the ending of a film, to casting and other creative elements and focus group feedback being useful to the filmmakers, users may be solicited and/or unexpectedly pulled into system selected interactive duos and/or groups.

Biological information matching is advantageous not only with regard to social networking and searching for people, but also for searching for other things, such as videos, as posted on YOUTUBE and other media, as well as products associated with users (or other individuals). Biological and/or genetic information may be factored to enable an active and/or passive ability to locate other people, videos, films, creative products and writings, histories, including search history, and related information leading to other individuals and/or things related to individuals.

Moreover, programming and data managing may employ an evolving correlation, such as a mapping and/or tracking approach, for refining and improving options for users. For example, through genetic marker tracking, certain aspects repeating measurably within selected genetic information and that relate to individuals may reveal an increased propensity to drink alcohol, travel, or engage in athletic activities, as determined by information processor 102 receiving information from one or more databases.

Genetic (or biological-based) markers may be actively and/or passively engaged and/or revealed to user(s.) In an example of passively engaged information, an individual may be directed toward advertisers, for example, selling weight loss products, which may occur discreetly when system benchmarks are met from at least passively collected information and related to the user. The information may be derived from genetic and/or biological samples that are used to provide system usable data. Thus and in connection with this example, a person who may not be overweight but who has a propensity to gain weight, may be determined from at least gene-based data and other sources, such as third-party search engine data to consider such weight loss products. Thus, "steering" of at least marketing information may occur, based on such information that otherwise might not have been directly or consciously submitted to a venue by a user.

In another embodiment, a person who demonstrates a given trait deemed relevant in accordance with the teachings herein, is steered toward information related to a demographic and/or group of individuals who complement that trait, while not necessarily sharing it. An individual who, for example, is determined to be aggressive by various kinds of information may be steered to a demographic determined to be most interesting romantically to users such users sharing the trait or aspects related to the trait. In this subtle, yet complex maneuvering of interests based on passively received information that is analyzed relative to a user and to venue priorities, as described herein, may lead a user to individuals whom the user might never have personally considered, for example, romantically, individually and/or collectively. But, as a result of correlated data from the venue database and/or external databases, such discreet matches based not exclusively on similarities may result in powerful connections between users. For example, one might never have planned to search for a person who complements a user in certain ways, but behavioral data demonstrates to the venue operability a high likelihood of interest by a user in an unexpected other user and also the potential to bring the user (and potentially both users) to a single or mutual spending decision that neither, or at least the initial user, would have had much chance of doing prior to the venue inspired connection.

Further, biological and other information may be actively provided as responsive information, such as by responding to questions and prompts, which provides a wide range of operability herein. For example, a preference of users may be at least in part "breath quality" of people, or a type of person. In this example, breath quality is broken into five categories, A through E, and a testing component of the system employs a selected airborne particle testing method or other option for converting aspects of human breath exhaled into system usable data. These data may all or in part provide information for social interactions between users selected by users, with or without system influence imposed or based at least in part on advertiser objectives.

Accordingly, a user may seek a person of interest based on criteria, including breath, or solely based on breath parameters/criteria. Moreover, the system may suggest and/or instigate an interactive session between users, selected at least in part based on system based priorities. Moreover, an advertiser such as CREST toothpaste, may influence a user's interactive sessions based on the issue of breath preference, in the selection of a user in seeking information and/or other user(s). Moreover, an interactive session may be initiated, such as via audio and video interaction, such as provided by SKYPE (as known in the art) between users who have been targeted for interaction and/or provided incentives for this interaction. This session may be initiated all or in part based on passive information gathered, such as from genetic information. Further, this may provide an agreed-upon basis for an expected or unexpected "blind date" connection, wherein two or more users are placed in interactive scenarios for the purpose of social interaction, such as matchmaking and/or dating should there be a decision to relinquish anonymity, for example.

In accordance with an embodiment herein, at least two site users may (or may not) knowingly be in an interactive session that may involve rewards to the user(s). The session may provide informational or other priority benefit to the venue, including but not limited to the advertising and/or data sampling objectives, such as CREST in the above example. Continuing with this example, CREST has determined the value of information extracted from the interaction of individuals, such as concerning selected breath criteria and/or interest in breath trait/preference aspects. Collaborative reaction and preferences resulting from discussion(s) including by comparison, in this case, being valued as providing data that direct interaction by the venue with a single user, for example, would not likely gather.

Further, a trait such as related to human breath, and preferences related to breath, in one configuration has other corresponding information that selectively provides further value and data managing operability. For example, a genetic marker relating directly or at least closely to likely or actual breath aspects can selectively provide, augment or otherwise inform the profile of a user. There may be a genetic marker for bad breath, or for an aspect of human behavior that governs hygiene or sensitivity. Various interactive options may be augmented or altered, in case, for example, breath or other bodily odor of great concern to a user. Moreover, genetic and breath samples turned into data provide a tandem indicator of, for example, current breath qualities and likely future breath qualities that a single test could not alone provide. Further, a genetic test may determine that a user is more likely to care about the issue of breath and/or other peoples' breath, than an average user, thereby increasing that user's relevance to CREST and a new hypothetical "breath control" product line, for example.

In total, the system configuration options of weighing actively and passively collected data related to user(s,) including biologically based data, provides improved operability herein for key aspects of at least: social networking and searching, whether user provoked and/or system steered/influenced; and preference comparing and advertiser targeting and trait/preference based data sampling.

As set forth in applicant's priority document, the present invention provides options for "users" or "searchers:' (those using the database,) to reference and compare other personal traits and feedback from "members" (those having supplied the core data to the database,) allowing the database to serve as a source of information for decision-making and correlation related to matters beyond the purchase of products and services: In essence, a "people" based Internet SEARCH ENGINE rather than a "things." brand category or typical word-correlating search engine.

As set forth in applicant's priority document, advertisements may occur as editorial comments with Internet links, pertinent to data in the database specific to a products' or services' sampling results. These "factoids" may be calculated and relayed specifically to a single user who has met subjective system user relevance criteria to receive selected advertising data results. Further, focus group data, or consumer preference.

As set forth in applicant's priority document, options including narrowing the sample group based on the user supplied trait variable parameters based on a selected number of database profiles (or people.) or a selected percentage of the total database deemed by system parameters to be most similar to the user-defined micro-demographic. Further, the option to further narrow the sampling based on secondary variables, such as those database profiles that include photos or visual data, is demonstrated.

As set forth in applicant's priority document, a FACTOID may be presented by the system . . . based on a system determination that the user supplied data to this point in the search warranted this particular data FACTOID featuring this particular advertiser and link, to be relayed to this user. This FACTOID further demonstrates the preferred format and level of trivia and user-relevant interest that these unique advertising vehicles, tied to information from the database, may provide.

Figure 7:
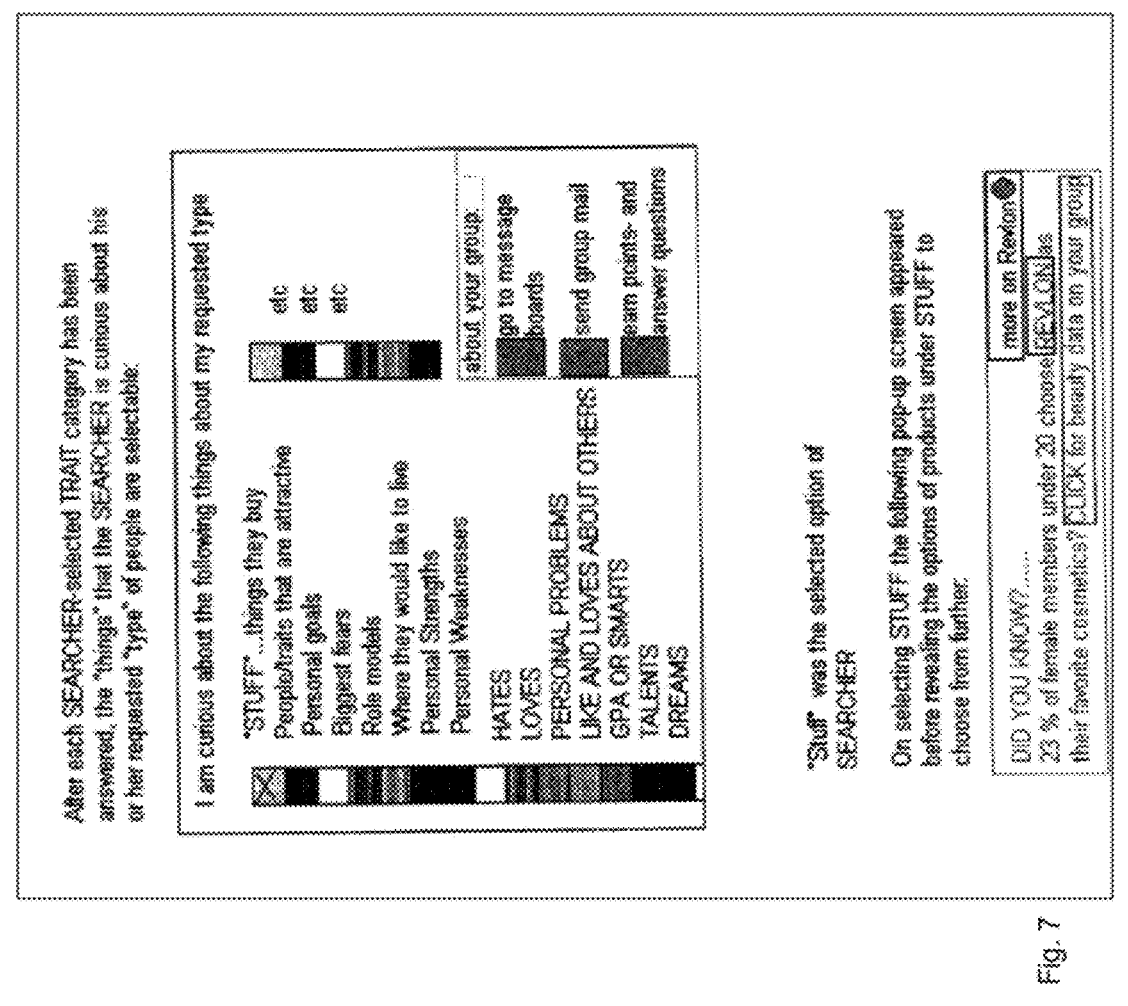

As set forth in applicant's priority document, [FIG. 7] demonstrates an initial master screen of some "preference" category options a SEARCHER might encounter; MEMBERS would have been presented selectively with the identical options when inputting their responses for direct and logical cross referencing of data for SEARCHERS. Options of sending mail or posting messages at any point during the search to a selectively specific number of members meeting selected similarity parameters to the SEARCHER are demonstrated; other options such as "becoming a member," returning to the previous screen, among other ongoing options kept on-screen throughout a search are selectively provided.

As set forth in applicant's priority document, [FIG. 7] also demonstrates a pop-up FACTOID advertisement and LINKING means, wherein an advertiser who has paid to be presented has been identified by computing means managing the database to be relevant enough to the given SEARCHERS current inquiries and selections, to have their advertisement featured; the advertisement would selectively be configured as a relevant piece of data pertaining to the database, to give it specific "human" or preference based relevance to the SEARCHER, with the selective option of having DIFFERENT data facts from the database pertaining to a single advertiser, or automatically variable facts that update automatically, available for display when selected thresholds of information relevance are met.

As set forth in applicant's priority document, a pop-up FACTOID advertisement and LINKING means [may be provided], wherein an advertiser who has paid to be presented has been identified by computing means managing the database to be relevant enough to the given SEARCHERS current inquiries and selections, to have their advertisement featured; the advertisement would selectively be configured as a relevant piece of data pertaining to the database, to give it specific "human" or preference based relevance to the SEARCHER, with the selective option of having DIFFERENT data facts from the database pertaining to a single advertiser, or automatically variable facts that update automatically, available for display when selected thresholds of information relevance are met.

Figure 8:
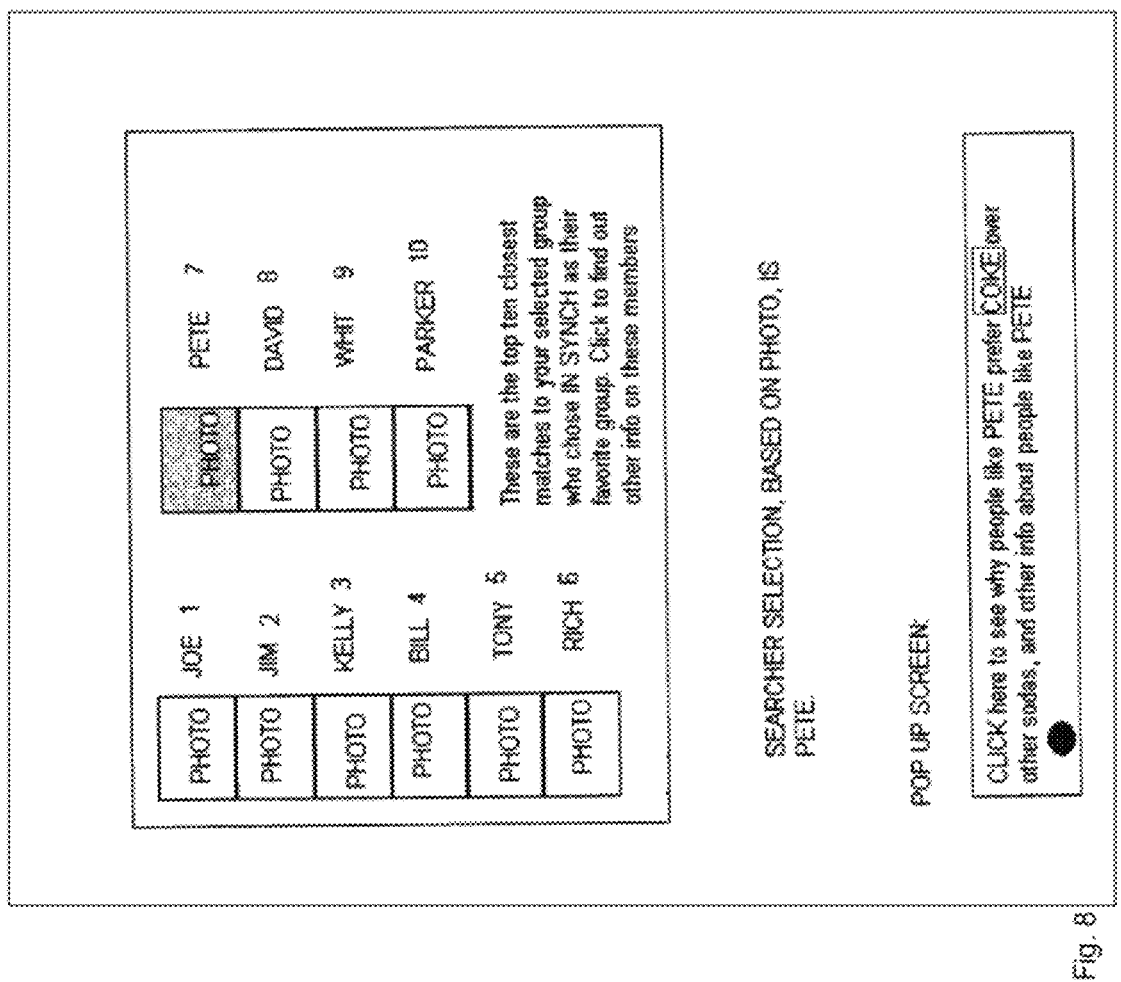

As set forth in applicant's priority document, [FIG. 8] demonstrates the SEARCHER-selected option of displaying a selected number of individual "members" by screen name who best correlate with the trait and preference parameters of the SEARCH to that point; in this case including only those members meeting the criteria who have photos on file. [FIG. 8] also demonstrates a FACTOID with relevance to the MEMBER selected which at this point has been determined to be a person of special interest to the SEARCHER, so data pertaining to him and others like him is selectively assumed to have special interest and selling potential. Linking means to provide further value to advertisers is also demonstrated.

Figure 9:
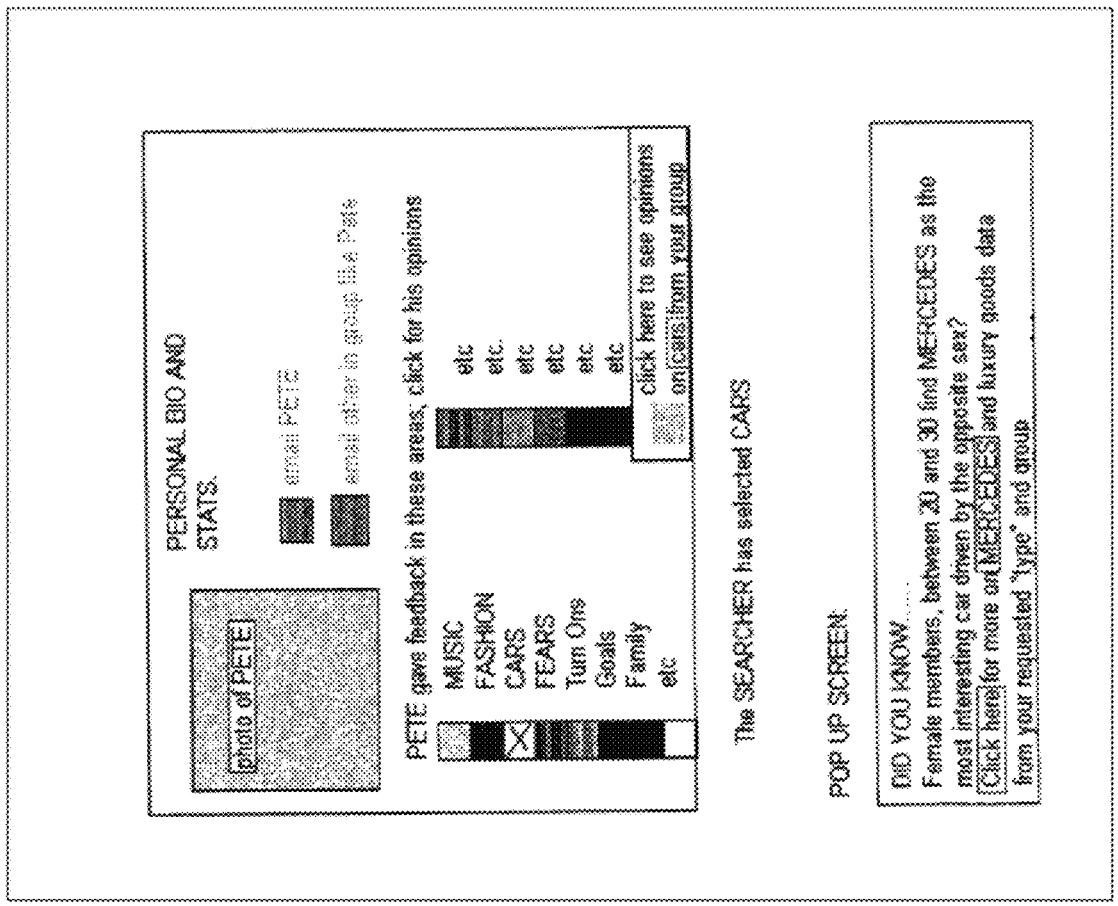

As set forth in applicant's priority document, [FIG. 9] demonstrates the PREFERENCE AND FEEDBACK PROFILE SCREEN of the selected MEMBER who was of special interest to the SEARCHER at that particular point of the SEARCH. This member's areas of available data, are demonstrated; meaning that this member to-date has provided accessible data in the listed categories or venues of options. [FIG. 9] demonstrates further options that might be presented once a further subcategory is selected by the SEARCHER: the example given involves CARS, so the option of referencing back to car preferences of the SEARCHER's entire custom-demographic is selectively provided, as is a FACTOID of relevance to cars that may have further relevance to parameters input by the SEARCHER, (in this case, females of a selected age range is demonstrated as being of increased relevance.)

Figure 10:
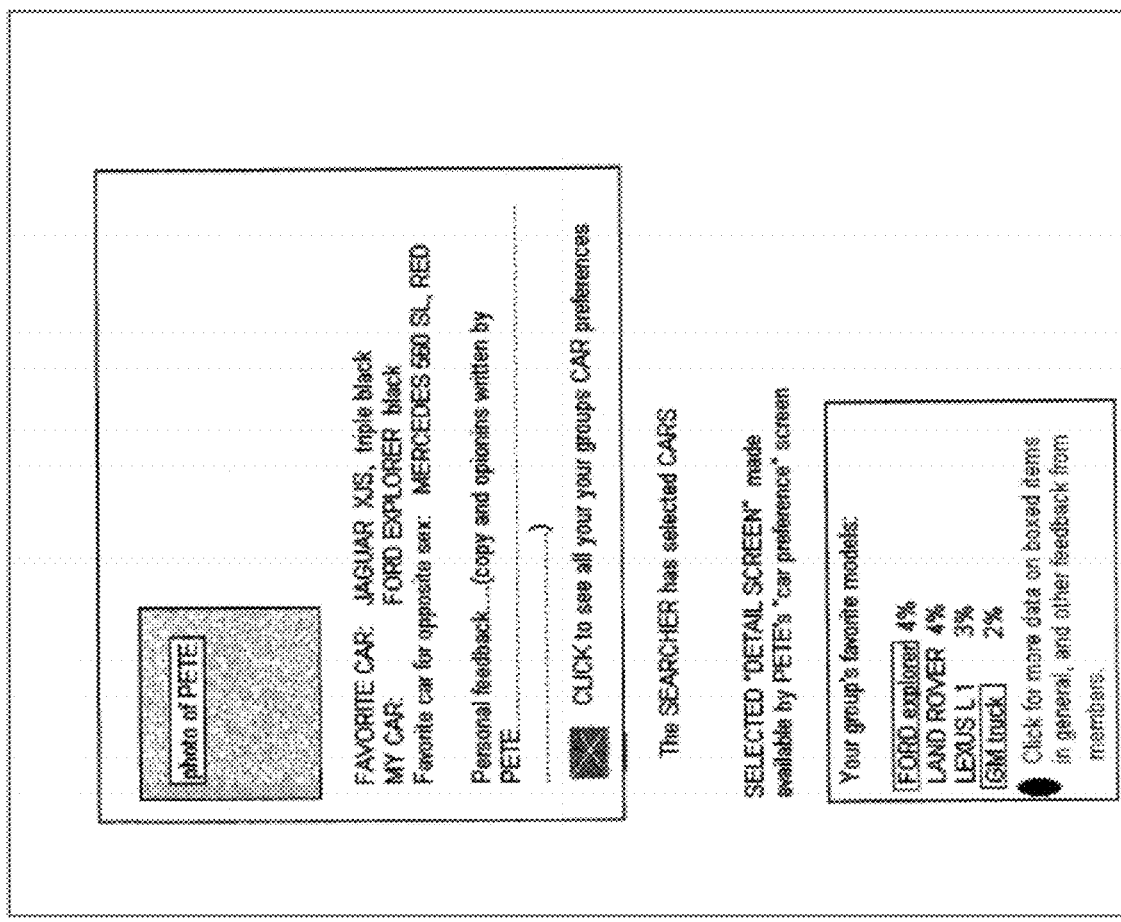

As set forth in applicant's priority document, [FIG. 10] demonstrates a data screen of information provided by the single member selected by the searcher, including LONG FORM feedback, written by the MEMBER at his option. [FIG. 10] further demonstrates the option to broaden the search back out to include more members in the sampling, though tailored to the area of interest (cars) currently being selected. It is suggested that a list of options to move out of a particular category of search, back to the MASTER PREFERENCE CATEGORY screen be provided on every screen displayed. [FIG. 10] further demonstrates the display of the SEARCHER's custom demographic preferences in total to the interest are of "car preferences." Those BRANDS featured who are also advertisers are indicated with LINKING means in this example.

Although the present invention is described and shown in relation to particular embodiments thereof, many other variations and modifications and other uses will become apparent to those skilled in the art. It is preferred, therefore, that the present invention be limited not by the specific disclosure herein.

What is claimed is:

1. A system, comprising:
   at least one processor readable media operatively coupled to at least one processor;
   at least one communication device operatively coupled to the at least one processor;
      at least one database stored on the at least one processor readable media, the at least one database comprising:
         (i) trait information representing at least one trait respectively associated with at least some of a plurality of respective users;
         (ii) preference information representing at least one selected from a group of interest and preference respectively associated with at least some of the plurality of respective users;
         (iii) electronic image information respectively representing at least one of the plurality of respective users;
         (iv) advertiser information representing at least one selected from a group of a plurality of respective advertisers and a respective product associated with at least one of the plurality of respective advertisers; and
         (v) advertiser targeting information representing criteria respectively used by at least one advertiser of the plurality of advertisers to target at least one of the plurality of respective users;
   wherein the at least one processor is configured to perform the following steps:
   receive, by the at least one processor, first electronic information from a first user computing device operated by a first user, wherein the first electronic information is associated with at least one selected from a group of a topic, person and type of person;
   determine, by the at least one processor, a first group of at least some of the plurality of respective users, wherein the determining is in accordance with at least a relevance of the first group to the first user as a function of the first electronic information;
   determine, by the at least one processor, a second group of at least one user from the plurality of respective users, at least in part in accordance with at least:
      a) second electronic information associated with at least one user in the first group, received by the at least one processor and from the first user computing device;
      b) at least one from a grouper of:
         at least some of the trait information associated with at least one user in the first group; and
         at least some of the preference information associated with at least one user in the first group; and
      c) at least some of the advertiser targeting information associated with at least one advertiser;
   select, by the at least one processor, at least some of the advertiser information respectively associated with the at least one advertiser, in relation to a relevance of the at least one advertiser with at least one user of the second group;
   send by the at least one processor to the first user computing device, the selected at least some of the advertiser information;
   send by the at least one processor to the first user computing device, at least access to at least one image representing at least one user associated with the second group; and
   send by the at least one processor to the first user computing device, at least one electronic prompt to initiate an exchange of content between the first user and at least one user associated with the second group.

2. The system of claim 1, wherein the at least one electronic image includes video.

3. The system of claim 1, wherein the selected at least some of the advertiser information includes brand-related information.

4. The system of claim 1, wherein the selecting the at least some of the advertiser information is based at least on a matching of the at least some of the advertiser targeting information associated with the at least one advertiser with at least one selected from a group of trait information and preference information associated with at least one user of the second group.

5. The system of claim 1, wherein the trait information includes information corresponding to at least a one physical aspect of at least one of the plurality of users.

6. The system of claim 1, wherein the at least one processor is further programmed and configured to receive the content and transmit other content related at least to the content to at least one other computing device.

7. The system of claim 1, wherein the at least one processor is further programmed and configured to provide the first electronic information to at least one computing device respectively operated by at least one user of the first group, and to receive from the at least one computing device respectively operated by the at least one user of the first group modified respective preference information at least in part in accordance with the first electronic information submitted by the first user.

8. The system of claim 1, wherein the determining the second group and the selecting the at least some of the advertiser information occurs substantially simultaneously.

9. A method, the method comprising:
   storing, in at least one database provided on at least one processor readable media:
   (i) trait information representing at least one trait respectively associated with at least some of a plurality of respective users;
   (ii) preference information representing at least one selected from a group of interest and preference respectively associated with at least some of the plurality of respective users;
   (iii) electronic image information respectively representing at least one of the plurality of respective users;
   (iv) advertiser information representing at least one selected from a group of a plurality of respective advertisers and a respective product associated with at least one of the plurality of advertisers; and
   (v) advertiser targeting information representing criteria respectively used by at least one advertiser of the plurality of advertisers to target at least one of the plurality of respective users;
   receiving, by at least one processor, first electronic information from a first user computing device operated by a first user, wherein the first electronic information is associated with at least one selected from a group of a topic, person and type of person;
   determining, by the at least one processor, a first group of at least some of the plurality of respective users, wherein the determining is in accordance with at least on a relevance of the first group to the first user as a function of the first electronic information;
   determining, by the at least one processor, a second group of at least one user from the plurality of respective users, at least in part in accordance with at least:
   a) second electronic information associated with at least one user in the first group, received by the at least one processor and from the first user computing device:
   b) at least one from a group of:
      at least some of the trait information associated with at least one user in the first group; and
      at least some of the preference information associated with at least one user in the first group; and
   c) at least some of the advertiser targeting information associated with the at least one advertiser;
   selecting, by the at least one processor, at least some of the advertiser information respectively associated with the at least one advertiser, in relation to a relevance of the at least one advertiser with at least one user of the second group;
   sending, by the at least one processor to the first user computing device, the selected at least some of the advertiser information;
   sending, by the at least one processor to the first user computing device, at least access to at least one image representing at least one user associated with the second group; and
   sending, by the at least one processor to the first user computing device, at least one electronic prompt to initiate an exchange of content between the first user and least one user associated with the second group.

10. The method of claim 9, wherein the at least one electronic image includes video.

11. The method of claim 9, wherein the selected at least some of the advertiser information includes brand-related information.

12. The method of claim 9, wherein the selecting the at least some of the advertiser information is based at least on a matching of the at least some of the advertiser targeting information associated with the at least one advertiser with at least one selected from a group of trait information and preference information associated with at least one user of the second group.

13. The method of claim 9, wherein the determining the first group is based at least on electronic trait information related to the first user.

14. The method of claim 9, further comprising receiving an agreement to exchange one or more of good and service from at least one advertiser in exchange for data provided by the first user.

15. The method of claim 9, further comprising receiving by the at least one processor electronic request information from the first user in response to a prompt, wherein the electronic request information regards at least one selected from a group of goods and services.

16. The method of claim 15, wherein the prompt for the electronic request information is at least partially affected by data requests from at least one of the advertisers.

17. The method of claim 9, wherein the determining the second group and the selecting the at least some of said advertiser information occurs substantially simultaneously.

* * * * *

UNITED STATES PATENT AND TRADEMARK OFFICE
CERTIFICATE OF CORRECTION

| | | |
|---|---|---|
| PATENT NO. | : 8,214,254 B1 | |
| APPLICATION NO. | : 12/475443 | |
| DATED | : July 3, 2012 | |
| INVENTOR(S) | : Craig Mowry | |

It is certified that error appears in the above-identified patent and that said Letters Patent is hereby corrected as shown below:

In the Claims

Column 27, Line 58, delete the text beginning with "1. A system, comprising:" to and ending "with the second group." in Column 28, Line 55, and insert the following claim:

--1. A system, comprising: at least one processor readable media operatively coupled to at least one processor; at least one communication device operatively coupled to the at least one processor; at least one database stored on the at least one processor readable media, the at least one database comprising: (i) trait information representing at least one trait respectively associated with at least some of a plurality of respective users; (ii) preference information representing at least one selected from a group of interest and preference respectively associated with at least some of the plurality of respective users; (iii) electronic image information respectively representing at least one of the plurality of respective users; (iv) advertiser information representing at least one selected from a group of a plurality of respective advertisers and a respective product associated with at least one of the plurality of respective advertisers; and (v) advertiser targeting information representing criteria respectively used by at least one advertiser of the plurality of advertisers to target at least one of the plurality of respective users; wherein the at least one processor is configured to perform the following steps: receive, by the at least one processor, first electronic information from a first user computing device operated by a first user, wherein the first electronic information is associated with at least one selected from a group of a topic, person and type of person; determine, by the at least one processor, a first group of at least some of the plurality of respective users, wherein the determining is in accordance with at least a relevance of the first group to the first user as a function of the first electronic information; determine, by the at least one processor, a second group of at least one user from the plurality of respective users, at least in part in accordance with at least: a) second electronic information associated with at least one user in the first group, received by the at least one processor and from the first user computing device; b) at least one from a group of: at least some of the trait information associated with at least one user in the first group; and at least some of the preference information associated with at least one user in the first group; and c) at least some of the advertiser targeting information associated with at least one advertiser; select, by the at least one processor, at least some of the advertiser information respectively associated with the at least one advertiser, in Signed and Sealed this
Eighteenth Day of June, 2013

Teresa Stanek Rea
*Acting Director of the United States Patent and Trademark Office* relation to a relevance of the at least one advertiser with at least one user of the second group; send by the at least one processor to the first user computing device, the selected at least some of the advertiser information; send by the at least one processor to the first user computing device, at least access to at least one image representing at least one user associated with the second group; and send by the at least one processor to the first user computing device, at least one electronic prompt to initiate an exchange of content between the first user and at least one user associated with the second group.--